United States Patent
Poulin et al.

(10) Patent No.: US 12,139,216 B2
(45) Date of Patent: Nov. 12, 2024

(54) SYSTEM AND METHOD FOR CONTROLLING A TRACK SYSTEM FOR TRACTION OF A VEHICLE

(71) Applicant: Camso Inc., Magog (CA)

(72) Inventors: Etienne Poulin, Sherbrooke (CA); Alain Lussier, St-Francois Xavier de Brompton (CA)

(73) Assignee: Camso Inc., Magog (CA)

(*) Notice: Subject to any disclaimer, the term of this patent is extended or adjusted under 35 U.S.C. 154(b) by 0 days.

(21) Appl. No.: 16/645,340

(22) PCT Filed: Aug. 28, 2018

(86) PCT No.: PCT/CA2018/051036
§ 371 (c)(1),
(2) Date: Mar. 6, 2020

(87) PCT Pub. No.: WO2019/046929
PCT Pub. Date: Mar. 14, 2019

(65) Prior Publication Data
US 2021/0031844 A1    Feb. 4, 2021

Related U.S. Application Data

(60) Provisional application No. 62/556,101, filed on Sep. 8, 2017.

(51) Int. Cl.
*B62D 55/065* (2006.01)
*B62D 11/20* (2006.01)
(Continued)

(52) U.S. Cl.
CPC ............ *B62D 55/065* (2013.01); *B62D 11/20* (2013.01); *B62D 55/084* (2013.01);
(Continued)

(58) Field of Classification Search
CPC .. B62D 55/065; B62D 55/075; B62D 55/084; B62D 55/0655; B62D 55/116;
(Continued)

(56) References Cited

U.S. PATENT DOCUMENTS 1,130,117 A * 3/1915 Strait ................ B62D 11/24
180/6.54
1,383,425 A * 7/1921 Ray .................. B62D 11/20
180/9.5
(Continued)

FOREIGN PATENT DOCUMENTS

CA      2744681     12/2011
CA      2916631     7/2016
(Continued)

OTHER PUBLICATIONS

International Search Report issued on Dec. 3, 2018 in connection with International Patent Application PCT/CA2018/051036, 6 pages.
(Continued)

*Primary Examiner* — Anne Marie M Boehler
(74) *Attorney, Agent, or Firm* — Hahn Loeser & Parks LLP

(57) ABSTRACT

A track system for traction of a vehicle is controllable, including while the vehicle is in motion, notably to control how the track system is positioned and moves relative to at least part of a frame of the vehicle other than for steering the vehicle, based on one or more factors, including: an environment of the track, position and orientation of the track system relative to the frame of the vehicle, speed of the track system, speed of the vehicle, user's preferences and other suitable factors.

45 Claims, 19 Drawing Sheets

(51) Int. Cl.
  *B62D 55/084*  (2006.01)
  *B62D 55/104*  (2006.01)
  *B62D 55/24*   (2006.01)
  *G05D 1/00*    (2024.01)

(52) U.S. Cl.
  CPC ......... *B62D 55/104* (2013.01); *B62D 55/244* (2013.01); *G05D 1/0016* (2013.01); *B62D 55/0655* (2013.01)

(58) Field of Classification Search
  CPC ...... B62D 55/244; B62D 11/20; B62D 11/22; B62D 11/24; B62D 11/00; G05D 1/0016; G05D 2201/0201; G05D 2201/0202
  USPC .......... 180/9.44, 9.46, 9.52, 9.32; 280/6.154, 280/6.155; 701/38, 50
  See application file for complete search history.

(56) References Cited

U.S. PATENT DOCUMENTS

| | | | | |
|---|---|---|---|---|
| 6,263,989 | B1 | 7/2001 | Won | |
| 7,131,651 | B2* | 11/2006 | Laursen | B60G 99/00 280/6.154 |
| 8,430,188 | B2* | 4/2013 | Hansen | B62D 55/305 180/9.26 |
| 9,031,698 | B2* | 5/2015 | Smith | B62D 55/07 700/259 |
| 10,065,691 | B2* | 9/2018 | Missotten | A01D 41/12 |
| 10,421,489 | B2* | 9/2019 | Held | E21C 29/22 |
| 2004/0168837 | A1 | 9/2004 | Michaud | |
| 2009/0085311 | A1* | 4/2009 | Kim | B62D 33/07 280/6.154 |
| 2012/0215355 | A1* | 8/2012 | Bewley | B62D 55/075 700/258 |
| 2015/0367901 | A1* | 12/2015 | Studer | B62D 55/116 180/9.42 |
| 2016/0332681 | A1 | 11/2016 | Missotten | |
| 2018/0265145 | A1* | 9/2018 | Todd | B62D 55/244 |
| 2018/0338413 | A1* | 11/2018 | Connell | A01C 7/203 |
| 2020/0010131 | A1* | 1/2020 | Zona | B62D 55/065 |

FOREIGN PATENT DOCUMENTS

| | | |
|---|---|---|
| CA | 2947575 | 3/2017 |
| CA | 2910303 | 4/2017 |
| CA | 2953991 | 7/2017 |
| CA | 3014075 | 8/2017 |
| EP | 3678926 | 7/2020 |
| FR | 2731975 | 9/1996 |
| JP | 2017065311 A | 4/2017 |
| JP | 2018065311 | 4/2017 |
| WO | 2008/025141 | 3/2008 |
| WO | 2008/025143 | 3/2008 |
| WO | 2010/086027 | 8/2010 |
| WO | 2011/126582 | 10/2011 |
| WO | 2015/079418 | 6/2015 |
| WO | 2017/000068 | 1/2017 |
| WO | 2019046929 | 3/2019 |

OTHER PUBLICATIONS

Written Opinion of the International Search Authority issued on Dec. 3, 2018 in connection with International Patent Application PCT/CA2018/051036, 8 pages.

Extended European Search Report issued May 3, 2021, in connection with European Patent Application No. 18854235.1, 12 pages.

* cited by examiner

SYSTEM AND METHOD FOR CONTROLLING A TRACK SYSTEM FOR TRACTION OF A VEHICLE

CROSS-REFERENCE TO RELATED APPLICATIONS

This application is a national stage of International Application PCT/CA2018/051036 filed on Aug. 28, 2018 and claiming priority from U.S. Provisional Patent Application No. 62/556,101 filed on Sep. 8, 2017, which are incorporated by reference herein.

FIELD

This disclosure relates generally to vehicles and, more particularly, to vehicles comprising track systems for traction.

BACKGROUND

Certain vehicles, including industrial vehicles such as agricultural vehicles (e.g., harvesters, combines, tractors, etc.), construction vehicles (e.g., excavators, bulldozers, loaders, etc.), and forestry vehicles (e.g., feller-bunchers, tree chippers, knuckleboom loaders, etc.), military vehicles (e.g., combat engineering vehicles (CEVs), etc.), snowmobiles, and all-terrain vehicles (ATVs), for example, may be equipped with track systems to enhance their traction and floatation on soft, slippery and/or irregular grounds (e.g., soil, mud, sand, ice, snow, etc.) on which they operate.

A track system may move relative to a frame of a vehicle to which it provides traction, including by varying an orientation of the track system relative to at least part of the vehicle's frame. For example, in some cases, the track system may turn relative to at least part of the vehicle's frame about a steering axis to steer the vehicle on the ground. Also, in some cases, the track system may move relative to at least part of the vehicle's frame other than for steering the vehicle. For instance, the track system may pivot (e.g., swing) relative to at least part of the vehicle's frame so that front and rear ends of the track system move vertically to accommodate unevenness of the ground.

In such cases, movement of the track system relative to the vehicle's frame may be restricted or otherwise regulated. For instance, an anti-rotation device may be provided to restrict a pivoting movement of the track system in relation to the vehicle's frame. The anti-rotation device may sometimes be adjustable using a wrench, screwdriver, and/or other tools to tune a behavior of the track system. However, this adjustment process can be complex, time-consuming, and/or otherwise impractical and can result in inadequate adjustment of the anti-rotation device and, therefore, inadequate tuning of the track system's behavior.

For these and other reasons, there is a need to improve control of track systems for vehicles.

SUMMARY

In accordance with various aspects, this disclosure relates to control of a track system for traction a vehicle (e.g., an agricultural vehicle, a construction vehicle, etc.), including while the vehicle is in motion, notably to control how the track system is positioned (e.g., oriented) and/or can move relative to at least part of a frame of the vehicle other than for steering the vehicle, based on one or more factors, such as, for instance: an environment of the track system (e.g., a profile, a compliance, and/or any other characteristic of the ground, etc.); a position, including an orientation, of the track system relative to the frame of the vehicle (e.g., when the track system is turned to steer the vehicle or pivoted up or down based on the profile, the compliance or another characteristic of the ground, etc.); a state of the track system (e.g., a speed and/or a direction of motion of its track, etc.); a state of the vehicle (e.g., a speed and/or a direction of the vehicle, etc.); a user's preferences (e.g., ride quality, desire to "feel" the ground, etc.); and/or any other suitable factor.

For example, in accordance with an aspect, this disclosure relates to a control system for a vehicle. The vehicle comprises a frame and a track system for traction of the vehicle. The track system comprises a track that comprises a ground-engaging outer side and an inner side opposite to the ground-engaging outer side. The track system also comprises a track-engaging assembly for driving and guiding the track around the track-engaging assembly. The track-engaging assembly comprises a frame and a drive wheel for imparting motion to the track. The track system is pivotable about a pivot axis relative to the frame of the vehicle such that longitudinal ends of the track system move vertically. The control system comprises an actuator connectable to the track system and a processing entity configured to control the actuator for controlling a pivoting movement of the track system about the pivot axis relative to the frame of the vehicle.

In accordance with another aspect, this disclosure relates to a control system for a vehicle. The vehicle comprises a frame and a track system for traction of the vehicle. The track system comprises a track that comprises a ground-engaging outer side and an inner side opposite to the ground-engaging outer side. The track system also comprises a track-engaging assembly for driving and guiding the track around the track-engaging assembly. The track-engaging assembly comprises a frame and a drive wheel for imparting motion to the track. The track system is pivotable about a pivot axis relative to the frame of the vehicle to vary an angle of attack of the track system. The control system comprises an actuator connectable to the track system and a processing entity configured to control the actuator for controlling the angle of attack of the track system.

In accordance with another aspect, this disclosure relates to a control system for a vehicle. The vehicle comprises a frame and a track system for traction of the vehicle. The track system comprises a track that comprises a ground-engaging outer side and an inner side opposite to the ground-engaging outer side. The track system also comprises a track-engaging assembly for driving and guiding the track around the track-engaging assembly. The track-engaging assembly comprises a frame and a drive wheel for imparting motion to the track. The track system is pivotable about a pivot axis relative to the frame of the vehicle such that longitudinal ends of the track system move vertically. The control system comprises an actuator connectable to the track system and a processing entity configured to control the actuator for controlling a pivoting movement of the track system about the pivot axis relative to the frame of the vehicle in order to manage a pressure distribution of the track system on the ground.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for purposes of illustrating certain embodiments and are an aid for understanding. They are not intended to and should not be limiting.

DETAILED DESCRIPTION OF EMBODIMENTS

Figure 1:
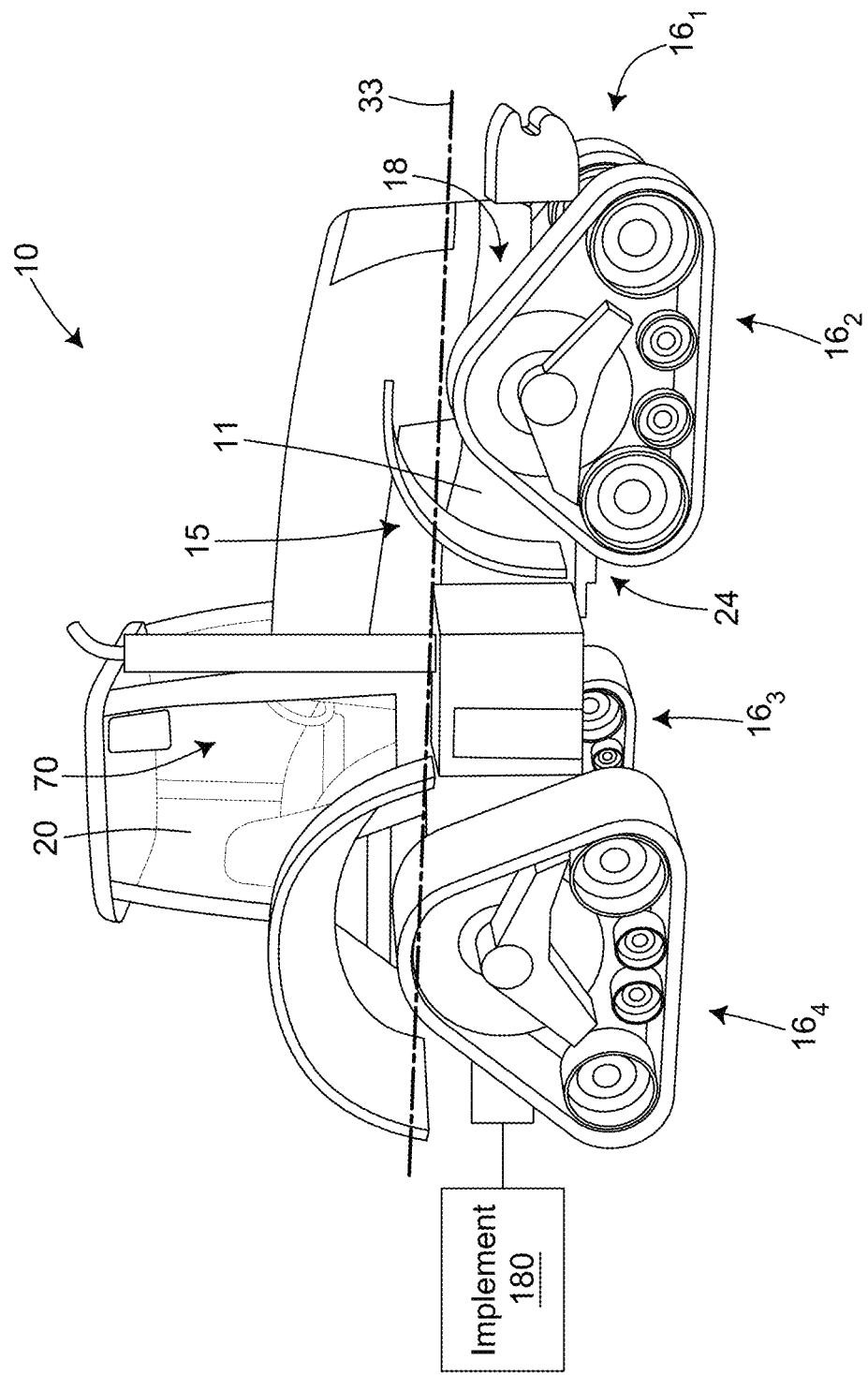
FIG. 1 shows an example of an embodiment of a vehicle comprising track systems for traction of the vehicle and a control system for controlling the track systems.

FIG. 1 shows an example of a vehicle 10 comprising track systems $16_1$-$16_4$ in accordance with an embodiment. In this embodiment, the vehicle 10 is a heavy-duty work vehicle for performing agricultural, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a harvester, a planter, or any other type of agricultural vehicle.

In this embodiment, the vehicle 10 comprises a frame 11, a powertrain 15, a steering mechanism 18, a suspension 24, and an operator cabin 20 that enable a user to move the vehicle 10 on the ground using the track systems $16_1$-$16_4$ and perform work using a work implement 180.

As further discussed later, in this embodiment, each track system $16_i$ is controllable, including while the vehicle 10 is in motion, notably to control how the track system $16_i$ is positioned (e.g., oriented) and/or can move relative to the frame 11 of the vehicle 10 other than for steering the vehicle 10, based on one or more factors, such as, for instance: an environment of the track system $16_i$ such as a characteristic of the ground (e.g., a profile of the ground, such as a slope or steepness or a levelness of the ground; a compliance of the ground, such as a softness or hardness of the ground, etc.); a position, including an orientation, of the track system $16_i$ relative to the frame 11 of the vehicle (e.g., when the track system $16_i$ is turned to steer the vehicle 10 or pivoted up or down based on the profile, the compliance or another characteristic of the ground, etc.); a state of the track system $16_i$ (e.g., a speed and/or a direction of motion of its track, etc.); a state of the vehicle 10 (e.g., a speed and/or direction of the vehicle 10, etc.); the user's preferences (e.g., ride quality, desire to "feel" the ground, etc.); and/or any other suitable factor.

The powertrain 15 is configured to generate motive power for the track systems $16_1$-$16_4$ to propel the vehicle 10 on the ground. To that end, the powertrain 15 comprises a prime mover 12 which is a source of motive power that comprises one or more motors. For example, in this embodiment, the prime mover 12 comprises an internal combustion engine. In other embodiments, the prime mover 12 may comprise another type of motor (e.g., an electric motor) or a combination of different types of motor (e.g., an internal combustion engine and an electric motor). Motive power generated by the prime mover 12 is applied to one or more of the track systems $16_1$-$16_4$. In some embodiments, the powertrain 15 may transmit power from the prime mover 12 to one or more of the track systems $16_1$-$16_4$ (e.g., via a transmission, a differential, and/or any other suitable mechanism). In other embodiments, at least part of the powertrain 15 (e.g., a motor and/or a transmission) may be part of one or more of the track systems $16_1$-$16_4$.

The operator cabin 20 is where the user sits and controls the vehicle 10. More particularly, the operator cabin 20 comprises a user interface 70 allowing the user to steer the vehicle 10 on the ground, operate the work implement 180, and control other aspects of the vehicle 10. In this embodiment, the user interface 70 comprises input devices, such as an accelerator, a brake control, and a steering device (e.g., a steering wheel, a stick, etc.) that are operated by the user to control motion of the vehicle 10 on the ground. The user interface 70 also comprises output devices such as an instrument panel (e.g., a dashboard) which provides indicators (e.g., a speedometer indicator, a tachometer indicator, etc.) to convey information to the user.

The work implement 180 is used to perform agricultural work. For example, in some embodiments, the work implement 180 may include a combine head, a cutter, a scraper pan, a tool bar, a planter, or any other type of agricultural work implement.

The track systems $16_1$-$16_4$ engage the ground to provide traction to the vehicle 10. More particularly, in this embodiment, front ones of the track systems $16_1$-$16_4$ provide front traction to the vehicle 10, while rear ones of the track systems $16_1$-$16_4$ provide rear traction to the vehicle 10.

Figure 2:
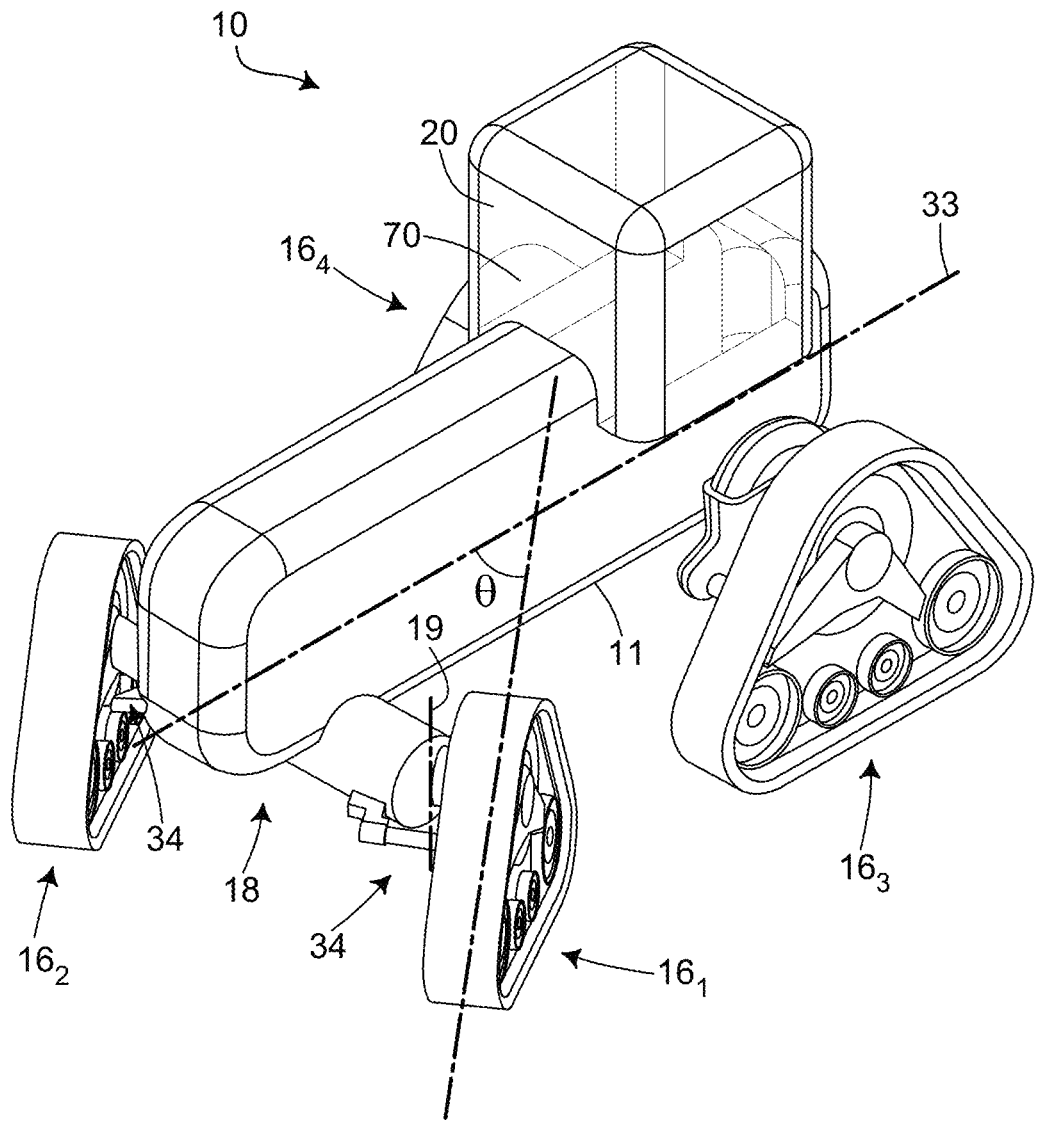
FIG. 2 shows an example where front ones of the track systems are pivoted to steer the vehicle.

In this embodiment, as shown in FIG. 2, each of the front ones of the track systems $16_1$-$16_4$ is pivotable relative to the frame 11 of the vehicle 10 about a steering axis 19 by the steering mechanism 18 (e.g., in response to input of the user at the steering device of the user interface 70) to change the orientation of that track system relative to the frame 11 in order to steer the vehicle 10 on the ground. The orientation of each of the front ones of the track systems $16_1$-$16_4$ relative to a longitudinal axis 33 of the vehicle 10, which defines a steering angle θ of that track system, is thus changeable. In this example, the steering mechanism 18 includes a steering unit 34 (e.g., comprising a steering knuckle) on each side of the vehicle 10 dedicated to each of the front ones of the track systems $16_1$-$16_4$ and defining the steering axis 19 for that track system. Each of the front ones of the track systems $16_1$-$16_4$ is therefore steerable.

Figure 3:
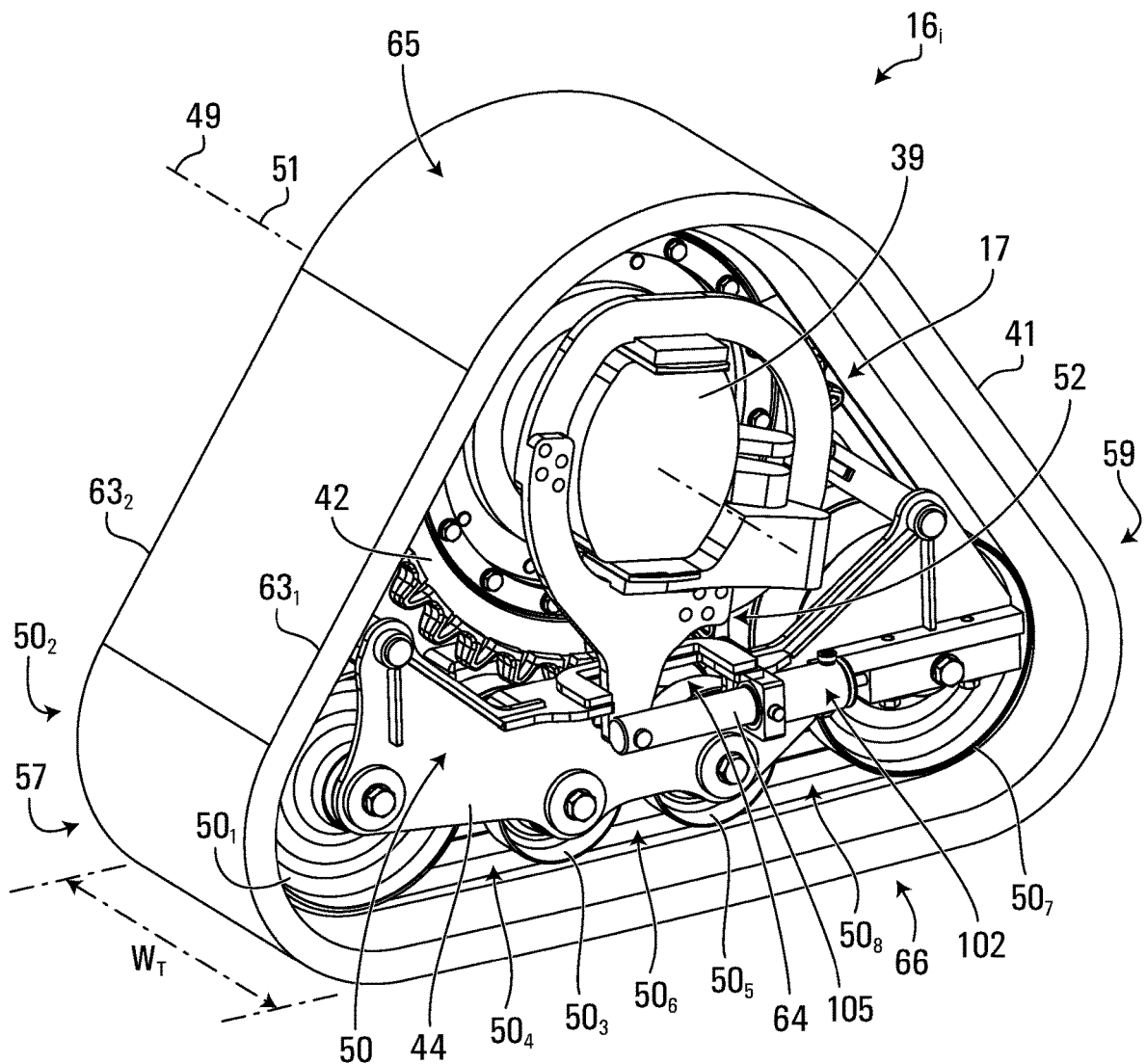
FIGS. 3 and 4 show a perspective view and a side view of a given one of the track systems.
Figure 4:
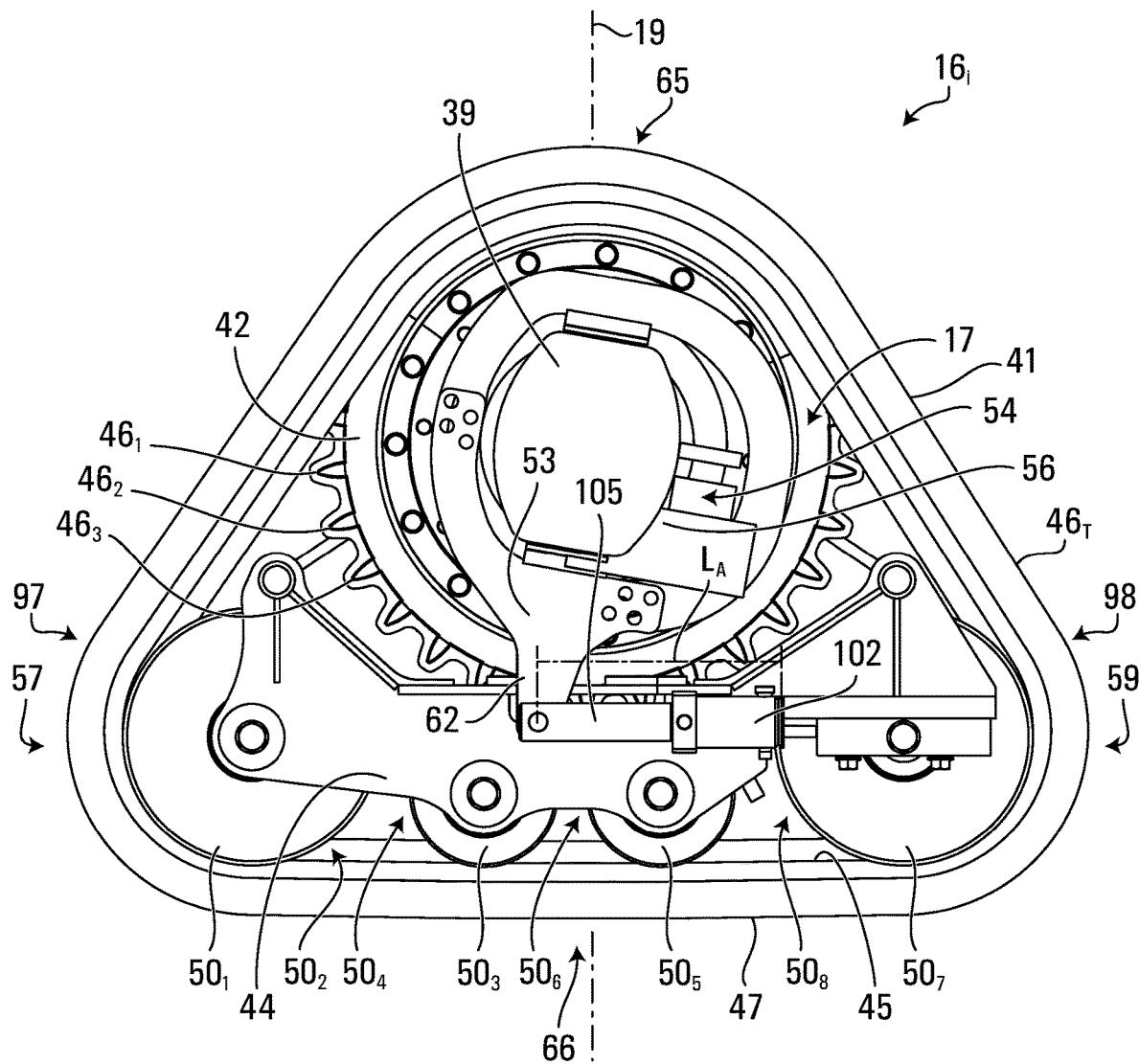
Figure 6:
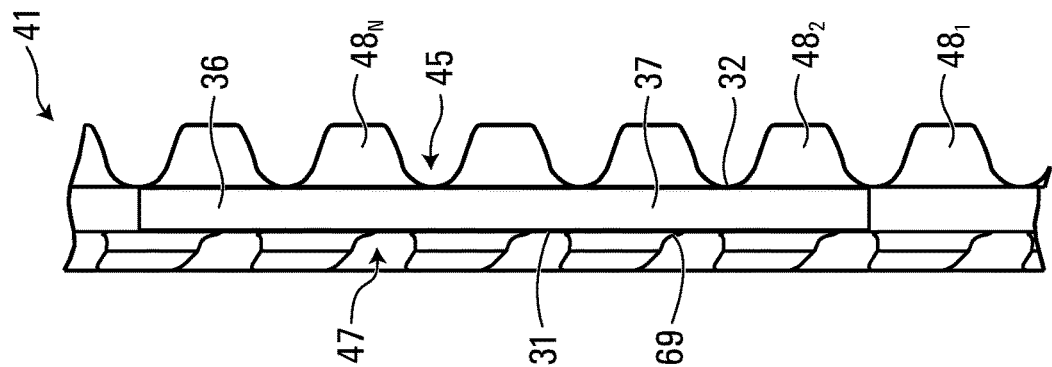
FIGS. 5 to 8 show an outer plan view, a side view, an inner plan view, and a cross-sectional view of a track of the given one of the track systems.
Figure 5:
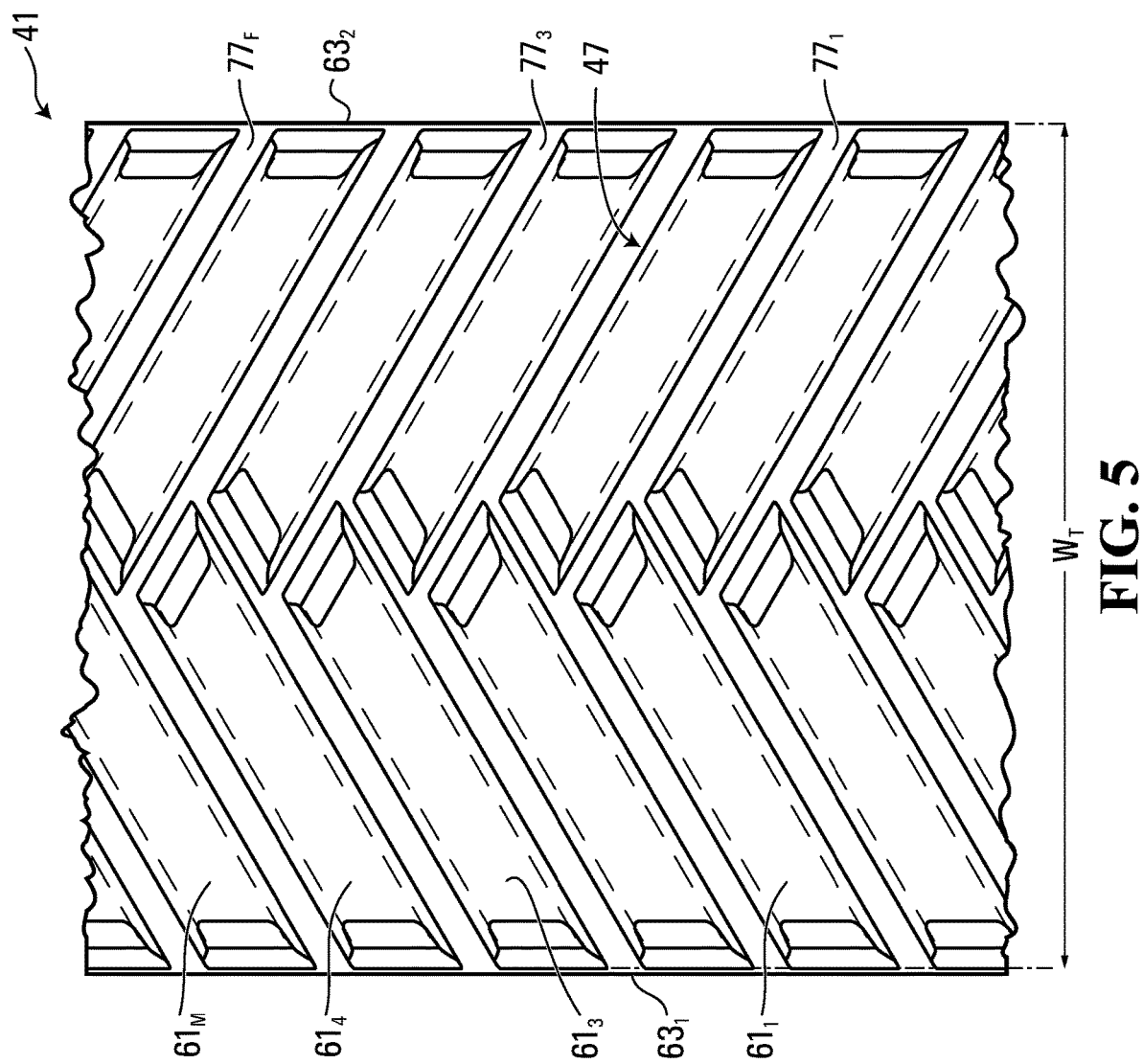
Figure 7:
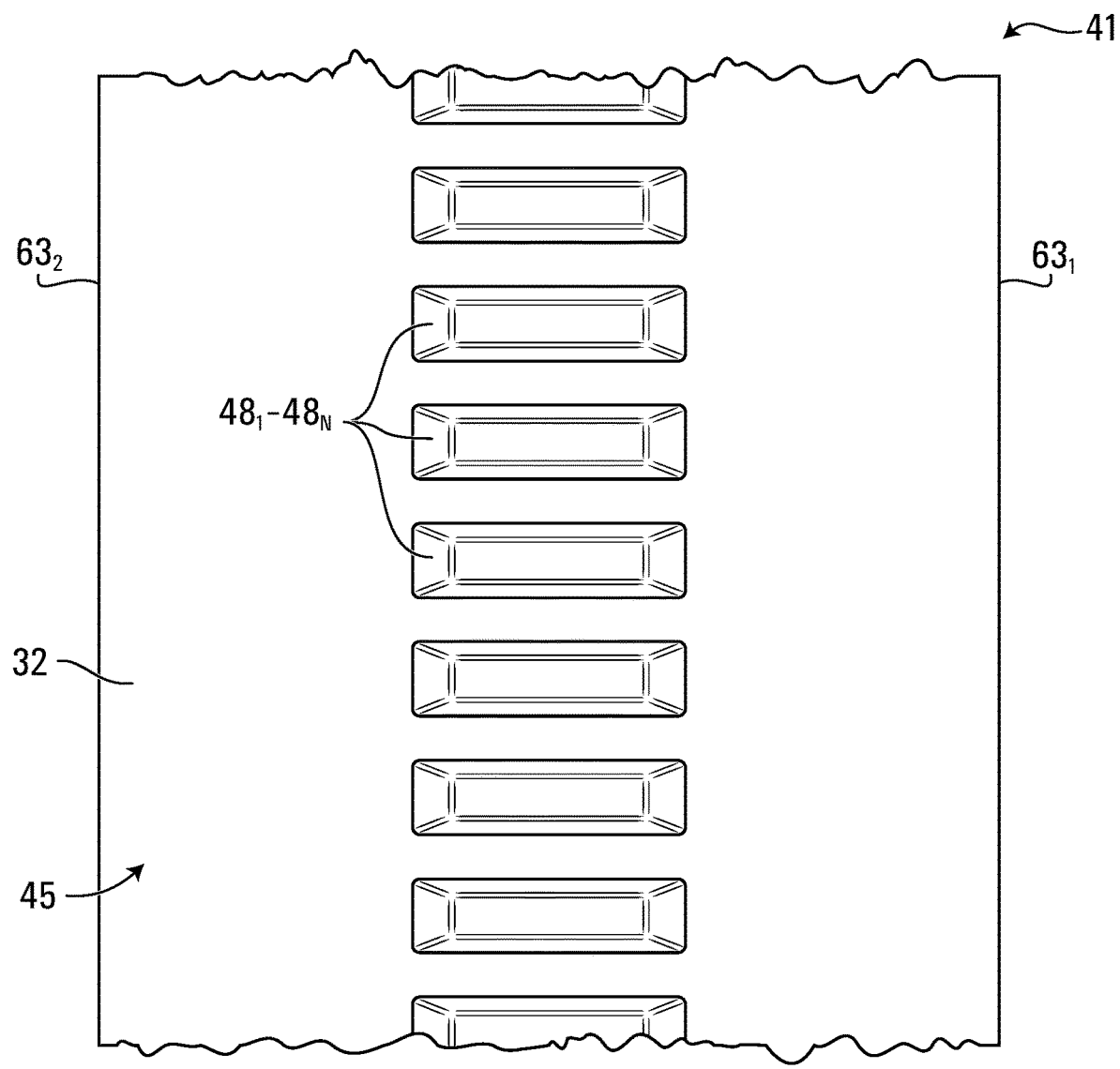
Figure 8:
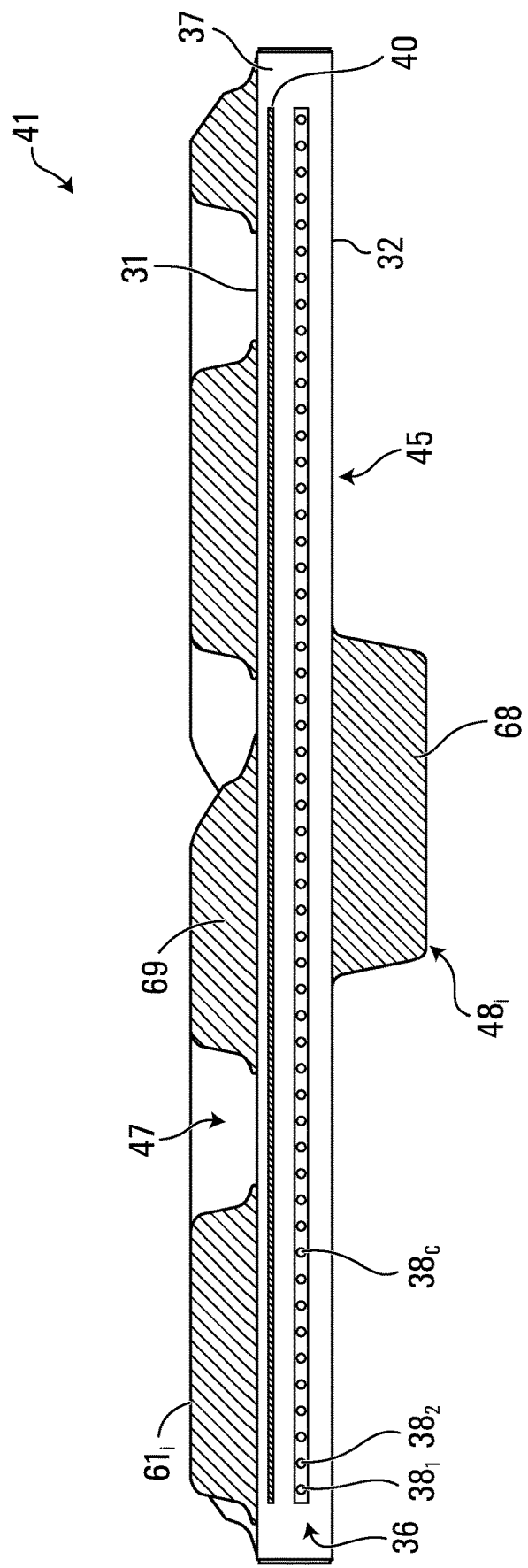

With additional reference to FIGS. 3 and 4, in this embodiment, each track system $16_i$ comprises a track-engaging assembly 17 and a track 41 disposed around the track-engaging assembly 17. In this example, the track-engaging assembly 17 comprises a frame 44 and a plurality of track-contacting wheels which includes a drive wheel 42 and a plurality of idler wheels $50_1$-$50_8$, which includes leading idler wheels $50_1$, $50_2$, trailing idler wheels $50_7$, $50_8$, and roller wheels $50_3$-$50_6$ between the leading idler wheels $50_1$, $50_2$ and the trailing idler wheels $50_7$, $50_8$. The track system $16_i$ has a front longitudinal end 57 and a rear longitudinal end 59 that define a length of the track system $16_i$. A width of the track system $16_i$ is defined by a width $W_T$ of the track 41. The track system $16_i$ has a longitudinal direction, a widthwise direction, and a heightwise direction.

The track 41 engages the ground to provide traction to the vehicle 10. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 5 to 8, the track 41 comprises an inner side 45 facing the wheels 42, $50_1$-$50_8$ and defining an inner area of the track 41 in which these wheels are located. The track 41 also comprises a ground-engaging outer side 47 opposite the inner side 45 for engaging the ground on which the vehicle 10 travels. Lateral edges $63_1$, $63_2$ of the track 41 define its width $W_T$. The track 41 has a top run 65 which extends between the longitudinal ends 57, 59 of the track system $16_i$ and over the track-engaging assembly 17, and a bottom run 66 which extends between the longitudinal ends 57, 59 of the track system $16_i$ and under the track-engaging assembly 17. The track 41 has a longitudinal direction, a widthwise direction, and a thicknesswise direction.

The track 41 is elastomeric, i.e., comprises elastomeric material, allowing it to flex around the wheels 42, $50_1$-$50_8$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_8$.

In this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in this embodiment, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_8$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_8$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in a plurality of rows that are spaced apart along the widthwise direction of the track 41. The drive/guide lugs $48_1$-$48_N$ may be arranged in other manners in other embodiments (e.g., a single row or more than two rows). Each of the drive/guide lugs $48_1$-$48_N$ is an elastomeric drive/guide lug in that it comprises elastomeric material 68. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs" or "traction profiles", are spaced apart in the longitudinal direction of the track system $16_i$. The ground-engaging outer side 47 comprises a plurality of traction-projectionfree areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle of the vehicle 10. In this example, the axis of rotation 49 corresponds to the axle of the vehicle 10. More particularly, in this example, the drive wheel 42 has a hub which is mounted to the axle of the vehicle 10 such that power generated by the prime mover 12 and delivered over the powertrain 15 of the vehicle 10 rotates the axle, which rotates the drive wheel 42, which imparts motion of the track 41.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of drive members $46_1$-$46_T$ (e.g., bars, teeth, etc.) distributed circumferentially of the drive sprocket 42 to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_8$ are not driven by power supplied by the powertrain 15, but are rather used to do at least one of supporting part of a weight of the vehicle 10 on the ground via the track 41, guiding the track 41 as it is driven by the drive wheel 42, and tensioning the track 41. More particularly, in this embodiment, the leading and trailing idler wheels $50_1$, $50_2$, $50_7$, $50_8$ maintain the track 41 in tension, and can help to support part of the weight of the vehicle 10 on the ground via the track 41. The roller wheels $50_3$-$50_6$ roll on the inner side 45 of the track 41 along the bottom run 66 of the track 41 to apply the bottom run 66 on the ground. The idler wheels $50_1$-$50_8$ may be arranged in other configurations and/or the track system $16_i$ may comprise more or less idler wheels in other embodiments.

The frame 44 of the track system $16_i$ supports components of the track system $16_i$, including the idler wheels $50_1$-$50_8$. More particularly, in this embodiment, the front idler wheels $50_1$, $50_2$ are mounted to the frame 44 in a front longitudinal end region of the frame 44 proximate the front longitudinal end 57 of the track system $16_i$, while the rear idler wheels $50_7$, $50_8$ are mounted to the frame 44 in a rear longitudinal end region of the frame 44 proximate the rear longitudinal end 59 of the track system $16_i$. The roller wheels $50_3$-$50_6$ are mounted to the frame 44 in a central region of the frame 44 between the front idler wheels $50_1$, $50_2$ and the rear idler wheels $50_7$, $50_8$. Each of the roller wheels $50_3$-$50_6$ may be rotatably mounted directly to the frame 44 or may be rotatably mounted to a link which is pivotally mounted to the frame 44 to which is rotatably mounted an adjacent one of the roller wheels $50_3$-$50_6$ (e.g., forming a "tandem").

The frame 44 of the track system $16_i$ is supported at a support area 39. More specifically, in this embodiment, the frame 44 is supported by the axle of the vehicle 10 to which is coupled the drive wheel 42, such that the support area 39 is intersected by the axis of rotation 49 of the drive wheel 42.

Figure 9:
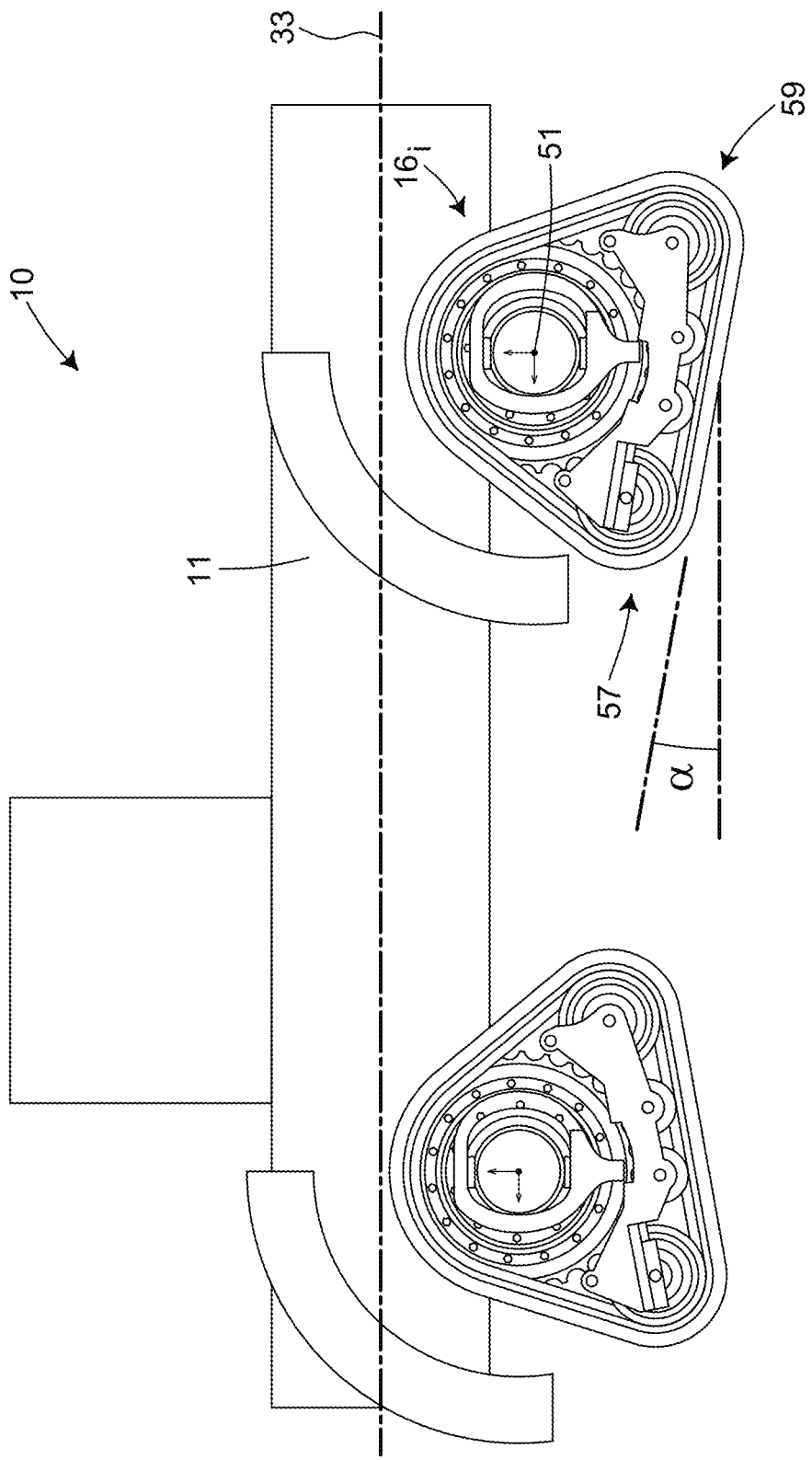
FIG. 9 shows an example of each of the track systems pivoting about a pivot axis relative to change an angle of attack of that track system.

In this embodiment, as shown in FIG. 9, the track system $16_i$ is pivotable (e.g., swingable) relative to the frame 11 of the vehicle 10 about a pivot axis 51 so that its longitudinal ends 57, 59 move vertically, such as, for instance, to accommodate unevenness of the ground. This may facilitate motion of the track system $16_i$ on uneven or other types of terrain and enhance its traction on the ground. The pivot axis 51 is transversal to the longitudinal direction of the track system $16_i$, and, in this example where the track system $16_i$ is steerable, transversal to the steering axis 19. In this case, the pivot axis 51 is substantially parallel to the widthwise direction of the track system $16_i$. The orientation of the track system $16_i$ relative to pivot axis 51, which can be observed as an orientation of the bottom run 66 of the track 41 or a longitudinal part of the frame 44 of the track system $16_i$ relative to the longitudinal direction of the vehicle 10, can be viewed as defining an "angle of attack" α.

More particularly, in this embodiment, the frame 44 of the track system $16_i$ is pivotable relative to the frame 11 of the vehicle 10 about the pivot axis 51. In this example, the pivot axis 51 corresponds to the axis of rotation 49 of the drive wheel 42 and the frame 44 can pivot about the axle of the vehicle 10 to which the drive wheel 42 is coupled. In other examples, the pivot axis 51 may be located elsewhere (e.g., lower than the axis of rotation 49 of the drive wheel 42).

In view of its pivotability relative to the frame 11 of the vehicle 10 about the pivot axis 51, in this embodiment, the track system $16_i$ comprises an anti-rotation device 52 to restrict the pivoting movement of the track system $16_i$ about the pivot axis 51 relative to the frame 11 of the vehicle 10. More particularly, in this embodiment, the anti-rotation device 52 is connectable between the frame 44 of the track system $16_i$ and the frame 11 of the vehicle 10 and configured to engage the frame 44 of the track system $16_i$ in order to limit the pivoting movement of the track system $16_i$ about the pivot axis 51.

A range of the pivoting movement of the track system $16_i$ about the pivot axis 51 is thus limited by the anti-rotation device 52. For example, in some embodiments, the anti-rotation device 52 may limit the range of the pivoting movement of the track system $16_i$ about the pivot axis 51 to no more than 30°, in some cases no more than 20°, in some cases no more than 10°, and in some cases even less.

In this embodiment, the anti-rotation device 52 comprises an abutting member 53 nonrotatable about the pivot axis 51 relative to the frame 11 of the vehicle 10 and configured to abut the frame 44 of the track system $16_i$ to limit a pivoting movement of the frame 44 of the track system 16i about the pivot axis 51. The abutting member 53 is secured to a nonrotatable structure 54 that is nonrotatable about the pivot axis 51 relative to the frame 11 of the vehicle 10. In this embodiment, the nonrotatable structure 54 comprises a portion of a housing 56 of a transmission (e.g., a planetary gearbox) for rotating the drive wheel 42. In other embodiments, the nonrotatable structure 54 may be a portion (e.g., a beam or other structural member) of the frame 11 of the vehicle 10. In this example, the abutting member 53 includes an abutment 62 extending into an opening 64 of a lower portion 50 the frame 44 of the track system $16_i$ to abut against longitudinal extremities of the opening 64 in order to limit the pivoting movement of the track system $16_i$ about the pivot axis 51.

The anti-rotation device 52 may be implemented in any other suitable way in other embodiments.

Figure 10:
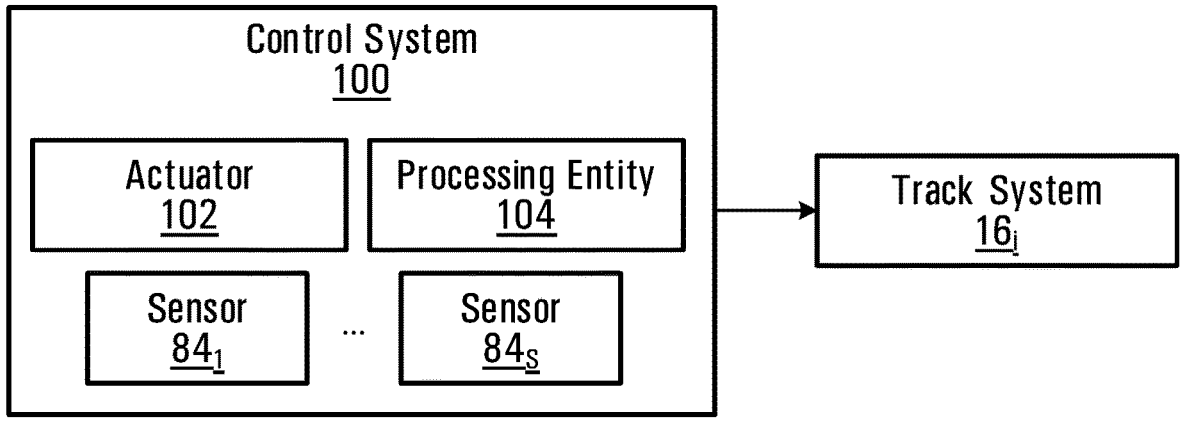
FIG. 10 shows an example of an embodiment of the control system to control the track systems.

In this embodiment, with additional reference to FIG. 10, the vehicle 10 comprises a control system 100 configured to control the track system $16_i$, including while the vehicle 10 is in motion, notably to control how the track system $16_i$ is positioned (e.g., oriented) and/or can move relative to the frame 11 of the vehicle 10 other than for steering the vehicle 10, based on one or more factors, such as, for instance: the environment of the track system $16_i$ (e.g., the profile of the ground, such as the slope or steepness or the levelness of the ground; the compliance of the ground, such as the softness or hardness of the ground, etc.; and/or any other characteristic of the ground); the position, including the orientation, of the track system $16_i$ relative to the frame 11 of the vehicle (e.g., when the track system $16_i$ is turned to steer the vehicle 10 or pivoted about the pivot axis 51 based on the profile, the compliance or another characteristic of the ground, etc.); the state of the track system $16_i$ (e.g., the speed and/or the direction of motion of its track 41, etc.); the state of the vehicle 10 (e.g., the speed and/or direction of the vehicle 10, etc.); the user's preferences (e.g., ride quality, desire to "feel" the ground, etc.); and/or any other suitable factor.

To that end, in this embodiment, the control system 100 is connected to the anti-rotation device 52 of the track system $16_i$ to control the pivoting movement of the track system $16_i$ about the pivot axis 51 relative to the frame 11 of the vehicle 10 (e.g., control the angle of attack α of the track system $16_i$). In this example, the anti-rotation device 52 is controllable while the vehicle 10 is in motion, such that it can be viewed as being "active".

In this embodiment, the control system 100 comprises an actuator 102 connected to the anti-rotation device 52 of the track system $16_i$ and a processing entity 104 configured to control the actuator 102.

More particularly, in this embodiment, the control system 100 is configured to control the pivoting movement of the track system $16_i$ about the pivot axis 51 relative to the frame 11 of the vehicle 10 in response to a command. In various embodiments, as further discussed below, this command, which may be referred to as a "track-pivoting command", may be generated automatically by the processing entity 104 and/or may be provided to the processing entity 104 by an individual such as the user of the vehicle 10.

The actuator 102 may be implemented in any suitable way. In this embodiment, the actuator 102 is a linear actuator configured to actuate by linear motion. More particularly, in this embodiment, the actuator 102 is a fluidic actuator (e.g., a hydraulic or pneumatic actuator) that comprises a piston-cylinder arrangement 105 connected to a fluid reservoir 106. The piston-cylinder arrangement 105 has a first portion 120 connected to the abutment 62 of the anti-rotation device 52 and a second portion 122 connected to the lower portion 50 the frame 44 and is changeable in length by selective extension and retraction. In this example, the actuator 102 is a hydraulic actuator. The actuator 102 may be any other type of actuator in other embodiments. For instance, in some embodiments, the actuator 102 may be an electromechanical actuator, may be a purely mechanical actuator, may be a pneumatic actuator, may actuate by rotary motion, etc.

One or more parameters of the actuator 102 may be controlled by the processing entity 104. For example, in some embodiments, depending on how the actuator 102 is implemented, the processing entity 104 may control: a length $L_A$ of the actuator 102, such as by selectively increasing it, decreasing it, locking it (i.e., preventing it from changing), and/or unlocking it (i.e., allowing it to change); a stiffness of the actuator 102, such as by selectively making it stiffer and less stiff; a preload of the actuator 102; etc.

In some embodiments, the control system 100 may automatically control (i.e., without user input) the pivoting movement of the track system $16_i$ about the pivot axis 51 relative to the frame 11 of the vehicle 10 (e.g., control the angle of attack α of the track system $16_i$). The track-pivoting command may thus be automatically generated by the processing entity 104 to control the anti-rotation device 52.

Automatic control of the anti-rotation device 52 by the control system 100 may be effected based on various information. For example, in some embodiments, this information may include:

information regarding the state of the vehicle 10, such as, for example: the speed of the vehicle 10; the direction of motion of the vehicle 10; a parameter of the steering mechanism 18 (e.g., the steering angle θ of the track system $16_i$); a parameter of the powertrain 15 of the vehicle 10 (e.g., a speed of the prime mover 12, a ratio of the transmission, etc.); a parameter of the suspension 24 (e.g., a suspension travel position, a suspension stroke position, a combination of both a suspension travel and stroke position, a combination of the steering angle θ of the track system $16_i$ and another parameter of the suspension 24, etc.); a load distribution on the vehicle 10 (e.g., loads on respective ones of the track systems $16_1$-$16_4$); and/or any other parameter that pertains to the state of the vehicle 10;

information regarding the environment of the track system $16_i$, such as, for example: the profile (e.g., the slope or steepness or the levelness) of the ground beneath the track system $16_i$; the compliance (e.g., softness or hardness) of the ground beneath the track system $16_i$; and/or any other parameter that pertains to the environment of the track system $16_i$; and/or information regarding the state of the track system $16_i$, such as, for example: the speed of motion of the track 41 around the track-engaging assembly 17; the direction of motion of the track 41 around the track-engaging assembly 17; the orientation of the track system $16_i$ (e.g., its steering angle θ and/or its angle of attack α relative to the pivot axis 51); loading on the track system $16_i$; a tension of the track 41; a physical characteristic (e.g., a temperature, etc.) of the track 41 of the track system $16_i$; and/or any other parameter that pertains to the state of the track system $16_i$; and/or any other information that may be relevant to controlling the anti-rotation device 52 of the track system $16_i$.

In this embodiment, the control system 100 comprises a plurality of sensors $84_1$-$84_S$ for sensing parameters of the vehicle 10 to provide parts of the information used to control the anti-rotation device 52 to the processing entity 104. For example, in some embodiments, the parameters of the vehicle 10 that can be sensed by the sensors $84_1$-$84_S$ may include:

the speed of the vehicle 10;

the direction of motion of the vehicle 10;

the orientation of the track system $16_i$ (e.g., its steering angle θ and/or its angle of attack α relative to the pivot axis 51);

the speed of the prime mover 12;

the suspension travel and/or stroke position of the suspension 24;

the loading on the track system $16_i$;

the profile (e.g., the slope or steepness or the levelness) of the ground beneath the track system $16_i$;

the compliance (e.g., softness or hardness) of the ground beneath the track system $16_i$;

the speed of motion of the track 41 around the track-engaging assembly 17;

the direction of motion of the track 41 around the track-engaging assembly 17;

a physical characteristic (e.g., a temperature, etc.) of the track 41 of the track system $16_i$;

the tension of the track 41;

etc.

Figure 11:
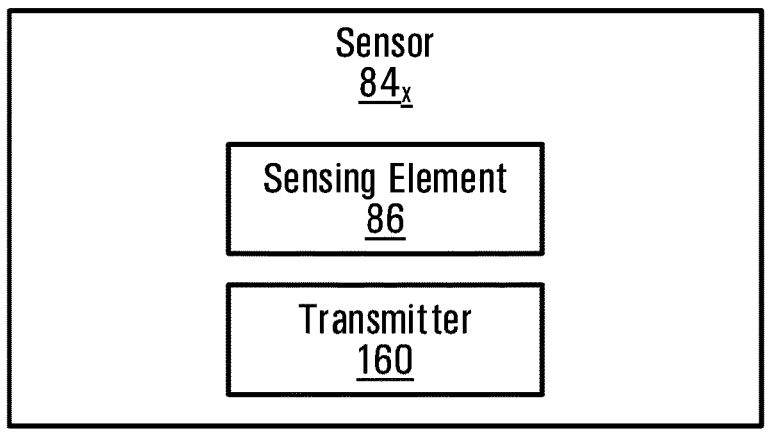
FIG. 11 shows an example of an embodiment of a sensor of the control system.
Figure 12:
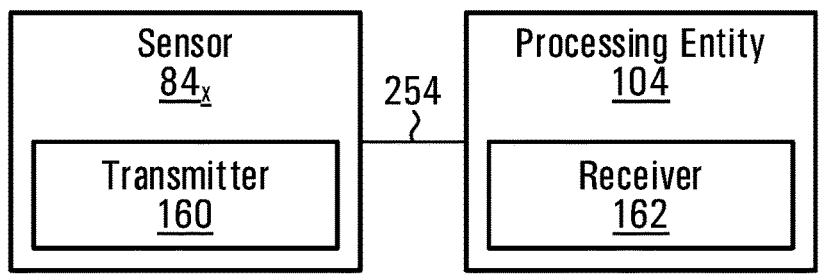
FIGS. 12 and 13 show examples of the sensor communicating with a processing entity of the control system via a communication link.

Each sensor $84_x$ is configured to sense a parameter of the vehicle 10 and issue a signal indicative of that parameter. To that end, with additional reference to FIG. 11, the sensor $84_x$ comprises a sensing element 86 configured to sense the parameter of the vehicle 10 to be sensed. For example, in some embodiments, to sense:

the speed of the vehicle 10, the sensing element 86 may comprise a speedometer of the vehicle 10;

the direction of motion of the vehicle 10, the sensing element 86 may comprise a gyroscope;

the steering angle θ of the track system $16_i$ about the steering axis 19, the sensing element 86 may comprise part of a steering angle sensor (e.g. potentiometer or linear ruler on a part of the steering mechanism 18);

the angle of attack α of the track system $16_i$ relative to the pivot axis 51, the sensing element 86 may comprise a gyroscope;

the speed of the prime mover 12, the sensing element 86 may comprise part of a primer mover speed sensor (e.g., engine speed sensor);

the suspension travel and/or stroke position of the suspension 24, the sensing element 86 may comprise any suitable linear transducers (e.g. one or more linear ruler, one or more linear encoder) and/or any suitable proximity sensors (e.g. one or more proximity switch) and/or any suitable photoelectric sensors (e.g. one or more photocell, one or more laser/light transmitter/receiver);

the loading on the track system $16_i$ the sensing element 86 may comprise one or more load cell (e.g. tension and/or compression load cell) or one or more strain gage;

the profile (e.g., the slope or steepness or the levelness) of the ground beneath the track system $16_i$, the sensing element 86 may comprise a gyroscope;

the compliance (e.g., softness or hardness) of the ground beneath the track system $16_i$, the sensing element 86 may comprise part of a laser sensor or an ultrasound sensor;

the speed of motion of the track 41 around the track-engaging assembly 17, the sensing element 86 may comprise a tachometer (e.g., a wheel speed sensor) configured to sense a rotational speed of the drive wheel 42;

the temperature or another physical characteristic of the track 41 of the track system $16_i$, the sensing element 86 may comprise a temperature sensor or another sensor for sensing that physical characteristic;

the tension of the track 41;

etc.

The sensor $84_x$ is configured to communicate the signal indicative of the parameter it senses to the processing entity 104 via a communication link 254. To that end, the sensor $84_x$ comprises a transmitter 160 for transmitting the signal indicative of the parameter it senses to the processing entity 104, which comprises a receiver 162 to receive the signal from the sensor $84_x$.

The transmitter 160 of the sensor $84_x$ and the receiver 162 of the processing entity 104 may establish the link 254 between one another in any suitable way. In some embodiments, the link 254 may be a wireless link such that the sensor $84_x$ and the processing entity 104 are connected wirelessly. Thus, in such embodiments, the transmitter 160 of the sensor $84_x$ is a wireless transmitter that can wirelessly transmit the signal from the sensor $84_x$ and the receiver 162 of the processing entity 104 is a wireless receiver that can wirelessly receive the signal. For example, the transmitter 160 and the receiver 162 may implement radio-frequency identification (RFID) technology. In such an example, the transmitter 160 may be an RFID tag while the receiver 162 may be an RFID reader (e.g., active, passive or battery-assisted passive (BAP) RFID technology). Any other wireless communication technology may be used in other examples (e.g., WiFi, dedicated short-range communication (DSRC), etc.). In other embodiments, the link 254 may be a wired link such that the sensor $84_x$ and the processing entity 104 are connected by a wire.

Figure 13:
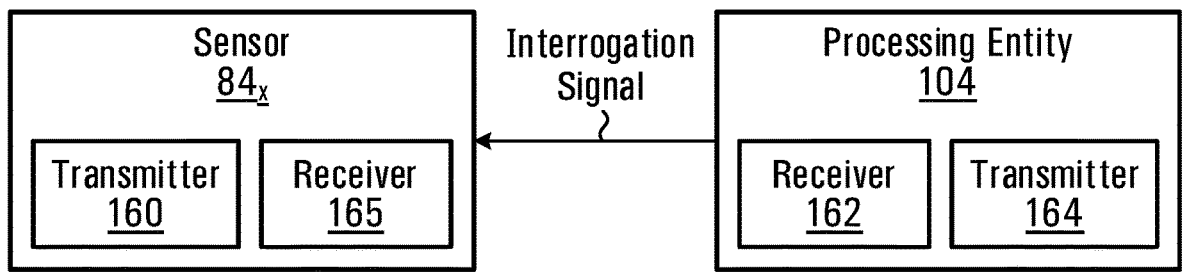

The signal indicative of the parameter of the vehicle 10 sensed by the sensor $84_x$ may be issued by the sensor $84_x$ in any suitable manner. In some embodiments, the sensor $84_x$ is configured to issue the signal autonomously. For instance, the transmitter 160 of the sensor $84_x$ may issue the signal repeatedly (e.g., periodically or at some other predetermined instants). In other embodiments, the processing entity 104 may be configured to issue an interrogation signal directed to the sensor $84_x$, which is configured to issue the signal indicative of the parameter of the vehicle 10 that it senses to the processing entity 104 in response to the interrogation signal. In such embodiments, as shown in FIG. 13, the processing entity 104 may comprise a transmitter 164 to transmit the interrogation signal to the sensor $84_x$, which comprises a receiver 165 to receive the interrogation signal.

The sensors $84_1$-$84_s$ may be located at various locations on the vehicle 10 in various embodiments.

For instance, in some embodiments, one or more of the sensors $84_1$-$84_s$ may be part of the track system $16_i$. For example, in some embodiments, one or more of the sensors $84_1$-$84_s$ may be part of the track 41. For instance, in some embodiments, one or more of the sensors $84_1$-$84_s$ may be embedded in the elastomeric material of the track 41. As an example, in some embodiments, one or more of the sensors $84_1$-$84_s$ may be arranged as discussed in International Application Publication WO/2017/000068, which is hereby incorporated by reference herein.

The processing entity 104 is configured to issue the track-pivoting command to control the pivoting movement of the track system $16_i$ about the pivot axis 51 relative to the frame 11 of the vehicle 10 based on information derived from the sensors $84_1$-$84_s$ and possibly other information. More specifically, in this embodiment, the processing entity 104 issues the track-pivoting command as a signal directed to the actuator 102 to control the anti-rotation device 52.

Figure 14:
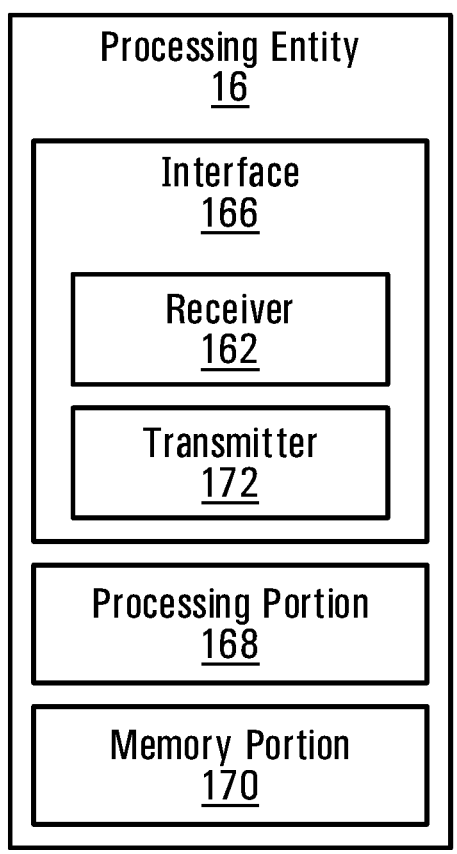
FIG. 14 shows an example of the processing entity of the control system.

In this embodiment, as shown in FIG. 14, the processing entity 104 comprises an interface 166, a processing portion 168, and a memory portion 170, which are implemented by suitable hardware and/or software.

The interface 166 comprises one or more inputs and outputs allowing the processing entity 104 to receive input signals from and send output signals to other components to which the processing entity 104 is connected (i.e., directly or indirectly connected). For example, in this embodiment, an input of the interface 166 is implemented by the receiver 162 to receive the signal from the sensor 84$_x$. An output of the interface 166 is implemented by a transmitter 172 to transmit the track-pivoting command to the actuator 102. In some embodiments, as shown in FIG. 13, another output of the interface 166 is implemented by the transmitter 164 to transmit the interrogation signal to the sensor 84$_x$ if applicable.

The processing portion 168 comprises one or more processors for performing processing operations that implement functionality of the processing entity 104. A processor of the processing portion 168 may be a general-purpose processor executing program code stored in the memory portion 170. Alternatively, a processor of the processing portion 168 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 170 comprises one or more memories for storing program code executed by the processing portion 168 and/or data used during operation of the processing portion 168. A memory of the memory portion 170 may be a semiconductor medium (including, e.g., a solid-state memory), a magnetic storage medium, an optical storage medium, and/or any other suitable type of memory. A memory of the memory portion 170 may be read-only memory (ROM) and/or random-access memory (RAM), for example.

In some embodiments, the processing entity 104 may determine the track-pivoting command based on information contained in the memory portion 170. For instance, the memory portion 170 may contain information associating different values of a parameter relating to the vehicle 10 with different values of a given parameter to be controlled in respect of the anti-rotation device 52. For example, in some embodiments, the memory portion 170 may associate different values of a given one of the speed of the vehicle 10, the direction of motion of the vehicle 10, the orientation of the track system 16$_i$ (e.g., its steering angle $\theta$ and/or its angle of attack $\alpha$ relative to the pivot axis 51), the suspension travel and/or stroke position of the suspension 24, the loading on the track system 16$_i$, the profile (e.g., the slope or steepness or the levelness) or the compliance of the ground beneath the track system 16$_i$, etc. with a particular value of a parameter (e.g., the length) of the actuator 102 for controlling the anti-rotation device 52. Thus, the processing entity 104 may consult its memory portion 170 in generating the track-pivoting command.

For example, in some embodiments, one or more mode of operations may be preprogrammed, e.g. in the memory portion 170 of the processing entity 104, based on information associating different values of a parameter relating to the vehicle 10 with different values of a given parameter to be controlled in respect of the anti-rotation device 52. For instance, one or more preprogrammed mode of operations may be configured such that the operation and/or behavior of the anti-rotation device 52 of the track systems (and/or the vehicle 10) is optimized for running over a given profile or type of ground (e.g. "mud mode", "snow mode", "road mode", "climb mode", "downhill mode"). As another example, one or more preprogrammed mode of operations may be configured to optimize the ride quality (e.g. "comfort mode"), when the vehicle 10 (and thus the track systems 16$_1$-16$_4$) rides over rough terrain (e.g. bumpy road/ground).

Other preprogrammed mode of operations may be configured for effecting the operation of the anti-rotational device 54 based on any one or more parameters of the vehicle 10, as discussed above.

In some embodiments, two or more elements of the processing entity 104 may be implemented by devices that are physically distinct from one another and may be connected to one another via a bus (e.g., one or more electrical conductors or any other suitable bus) or via a communication link which may be wired, wireless, or both. In other embodiments, two or more elements of the processing entity 104 may be implemented by a single integrated device.

The track-pivoting command issued by the processing entity 104 may manage the actuator 102 in any suitable way in order to control the pivoting movement of the track system 16$_i$ about the pivot axis 51 relative to the frame 11 of the vehicle 10. This may be used for various purposes for the vehicle 10.

Figure 15:
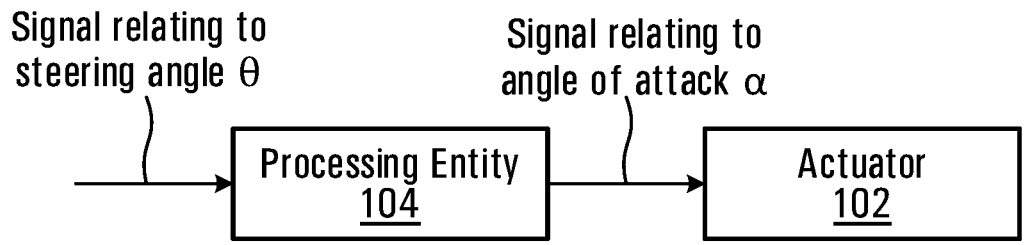
FIG. 15 shows an example of the processing entity of the control system, controlling the track systems based on steering angles of the track systems.

For example, in some embodiments, with additional reference to FIG. 15, the processing entity 104 may manage the actuator 102 in order to control the pivoting movement of the track system 16$_i$ about the pivot axis 51 relative to the frame 11 of the vehicle 10 (e.g., control the angle of attack $\alpha$ of the track system 16$_i$) based on the steering angle $\theta$ of the track system 16$_i$. For instance, in some embodiments, the processing entity 104 may manage the actuator 102 to selectively increase, decrease, lock (i.e., prevent change of), and/or unlock (i.e., allow change of) the angle of attack $\alpha$ of the track system 16$_i$ based on the steering angle $\theta$ of the track system 16$_i$.

Figure 16:
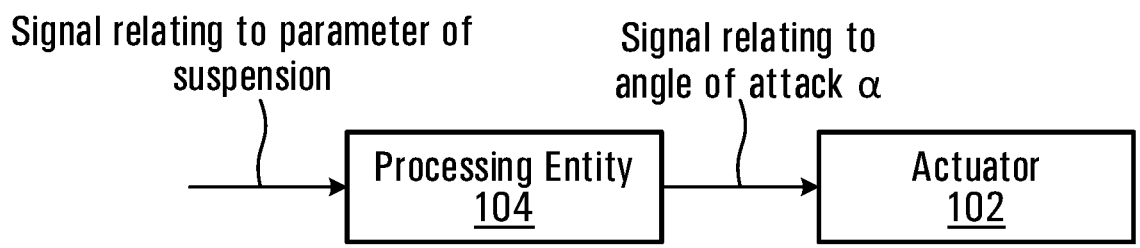
FIG. 16 shows an example of the processing entity of the control system, controlling the track systems based on a parameter of a suspension of the vehicle.

In some embodiments, with additional reference to FIG. 16, the processing entity 104 may manage the actuator 102 in order to control the pivoting movement of the track system 16$_i$ about the pivot axis 51 relative to the frame 11 of the vehicle 10 (e.g., control the angle of attack $\alpha$ of the track system 16$_i$) based on the suspension travel and/or stroke position of the suspension 24 of the vehicle 10. For instance, in some embodiments, the processing entity 104 may manage the actuator 102 to selectively increase, decrease, lock, and/or unlock the angle of attack $\alpha$ of the track system 16$_i$ based on the suspension travel and/or stroke position of the suspension 24.

In some embodiments, the processing entity 104 may manage the actuator 102 in order to control the pivoting movement of the track system 16$_i$ about the pivot axis 51 relative to the frame 11 of the vehicle 10 (e.g., control the angle of attack $\alpha$ of the track system 16$_i$) based on the loading on the track system 16$_i$ (e.g., based on the load distribution on the vehicle 10 reflected by the loads on respective ones of the track systems 16$_1$-16$_4$). For instance, in some embodiments, the processing entity 104 may manage the actuator 102 to selectively increase, decrease, lock, and/or unlock the angle of attack $\alpha$ of the track system 16$_i$ based on the loading on the track system 16$_i$.

Figure 17:
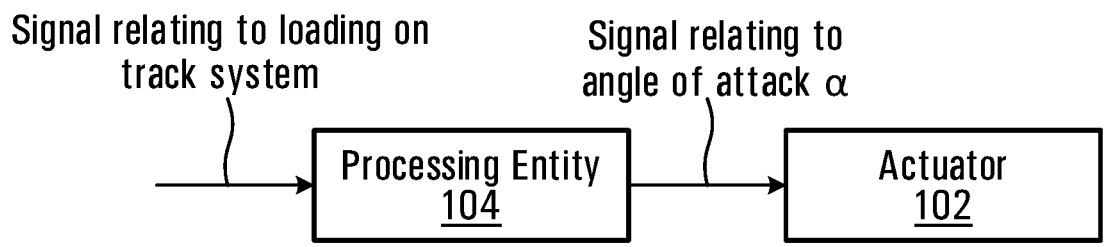
FIG. 17 shows an example of the processing entity of the control system, controlling the track systems based on loading on the track systems.

For example, in some embodiments, with additional reference to FIG. 17, the processing entity 104 may control the actuator 102 to selectively increase, decrease, lock, and/or unlock the angle of attack $\alpha$ of the track system 16$_i$ based on the loading on the track system 16$_i$ to manage a pressure distribution of the track system 16$_i$ on the ground (i.e., distribution of pressure applied by the track system 16$_i$ onto the ground), such as to make it more uniform or otherwise better.

For instance, in some embodiments, the support area 39 of the frame 44 of the track system 16$_i$, which in this example is intersected by the axis of rotation 49 of the drive wheel 42, may be offset from (i.e., not aligned with) a center of the frame 44 of the track system $16_i$ in the longitudinal direction of the track system $16_i$ such that the loading on the track system $16_i$ that passes though the support area 39 would tend to make the pressure applied onto the ground at a longitudinal end portion 97, in this case a front portion, of the track system $16_i$ greater than the pressure applied onto the ground at an opposite longitudinal end portion 98, in this case a rear portion, of the track system $16_i$, which could cause more ground compaction at the front portion 97 of the track system $16_i$ that may be undesirable (e.g., for crop growth), but, to avoid or at least mitigate this, the processing entity 104 may control the actuator 102 to increase or maintain the angle of attack $\alpha$ of the track system $16_i$ to transfer at least part of the loading on the track system $16_i$ towards the rear portion 98 of the track system $16_i$. This may help to make the pressure distribution of the track system $16_i$ on the ground more uniform.

For example, in some embodiments, where the support area 39 of the frame 44 of the track system $16_i$ is offset from the center of the frame 44 of the track system $16_i$ in the longitudinal direction of the track system $16_i$, the processing entity 104 may control the actuator 102 to manage the angle of attack $\alpha$ of the track system $16_i$ such that a ratio of the pressure applied onto the ground at the front portion 97 of the track system $16_i$ over the pressure applied onto the ground at the rear portion 98 of the track system $16_i$ is between 0.5 and 1.5, in some cases between 0.7 and 1.2, in some cases between 0.95 and 1.05, and in some cases even closer to or equal to 1. For instance, in some cases, a ratio of the pressure applied onto the ground at the front portion 97 of the track system $16_i$ over the pressure applied onto the ground at the rear portion 98 of the track system $16_i$ is $\frac{2}{3}$.

As another example, in some embodiments, when there is less load on the track system $16_i$ (e.g., when the vehicle 10 is driven on a road without the working implement or not under harsh working conditions), the angle of attack $\alpha$ may be selectively modified to reduce a contact area (i.e., "contact patch") between the track 41 and the ground to a minimum, allowing steering the track system $16_i$ with less restriction (e.g. friction) on the ground. This may be particularly useful to reduce a risk of "de-tracking" the track 41 from the track system $16_i$ on hard surfaces (e.g. asphalt road) while steering, when high traction capabilities may not be necessary.

As another example, in some embodiments, when obstacles have to be overcome, the pressure at one end of the track system $16_i$ may be significantly greater than at the other end of the track system $16_i$. For instance, the angle of attack $\alpha$ may be selectively modified so that the pressure is applied onto the ground only at the rear portion 98 of the track system $16_i$ (i.e. the front portion 97 of the track system $16_i$ is lifted). This may be useful to overcome obstacles protruding from the ground (e.g. a large rock, a mogul . . . ).

Figure 18:
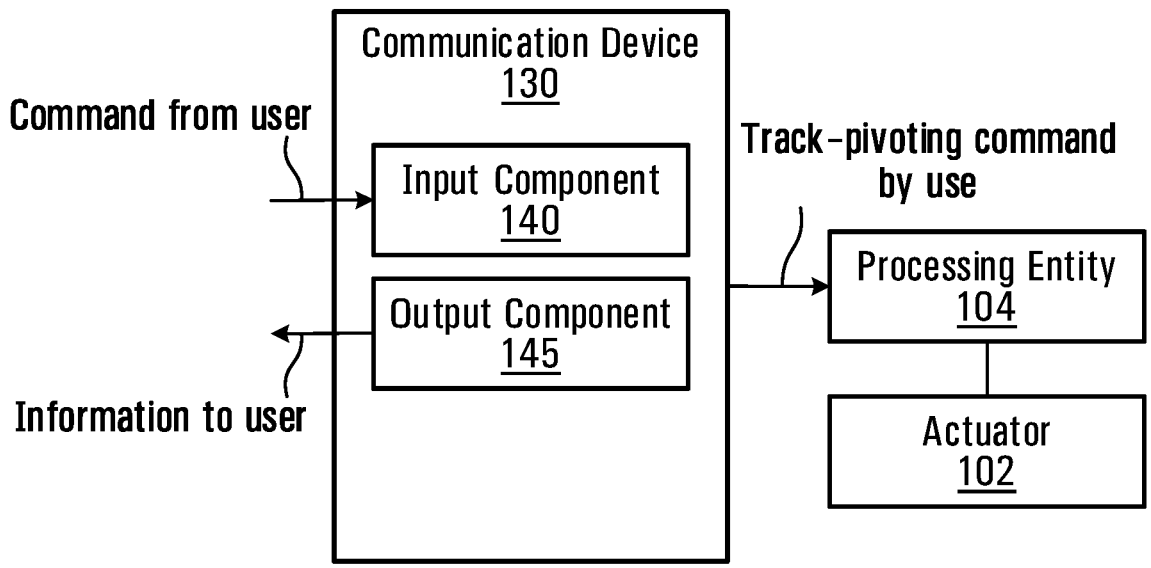
FIG. 18 shows an example of an embodiment of the control system that allows on-demand control of the track systems by a user of a communication device.

With additional reference to FIG. 18, in some embodiments, the control system 100 may be configured to allow an individual such as the user of the vehicle 10 to provide the track-pivoting command in order to control the pivoting movement of the track system $16_i$ about the pivot axis 51 relative to the frame 11 of the vehicle 10 (e.g., control the angle of attack $\alpha$ of the track system $16_i$). The track-pivoting command may thus be provided to the processing entity 104 by the user to control the anti-rotation device 52 "on-demand".

A communication device 130 can be used by the user to communicate with the processing entity 104. The communication device 130 comprises an input component 140 that the user can act upon to input the track-pivoting command in order to control the anti-rotation device 52. For example, in some embodiments, the input component 140 may comprise a mechanical input element, such as a button, a switch, a lever, a dial, a knob, or any other physical element, and/or a virtual input element, such as a virtual button or other virtual control of a graphical user interface (GUI) displayed on a screen that the user can act upon to control the pivoting movement of the track system $16_i$ about the pivot axis 51 relative to the frame 11 of the vehicle 10 (e.g., control the angle of attack $\alpha$ of the track system $16_i$).

The communication device 130 may also comprise an output component 145 that can convey information about the pivoting movement of the track system $16_i$ about the pivot axis 51 relative to the frame 11 of the vehicle 10 (e.g., the angle of attack $\alpha$ of the track system $16_i$) to the user in order to facilitate its control. In some embodiments, the output component 145 may comprise a display for displaying information to the user or a speaker for emitting sound (e.g., an alarm, an utterance, etc.). For example, in some embodiments, the output component 145 may convey the angle of attack $\alpha$ of the track system $16_i$, one or more characteristics (e.g., the profile or the compliance) of the ground, a suggested change in the angle of attack $\alpha$ of the track system $16_i$, a ratio of the load applied on a front portion of the track system $16_i$ over the load applied on a rear portion of the track system $16_i$, etc.

The user can interact with the communication device 130 to provide the track-pivoting command to the processing entity 104 of the control system 100 in order to control the pivoting movement of the track system $16_i$ about the pivot axis 51 relative to the frame 11 of the vehicle 10 (e.g., control the angle of attack $\alpha$ of the track system $16_i$). For instance, in various embodiments, the user may interact with the communication device 130 to selectively increase, decrease, lock, and/or unlock the angle of attack $\alpha$ of the track system $16_i$ when the vehicle 10 is steered to turn (e.g., based on the steering angle $\theta$ of the track system $16_i$), based on the loading on the track system $16_i$ to manage the pressure distribution of the track system $16_i$ on the ground (e.g., make it more uniform by transferring some of the loading towards the rear part 98 of the track system $16_i$), etc., as discussed above. The user may also interact with the communication device 130 to select a preprogrammed mode of operation as desired by the user, as discussed above, or for any other purpose.

Figure 19:
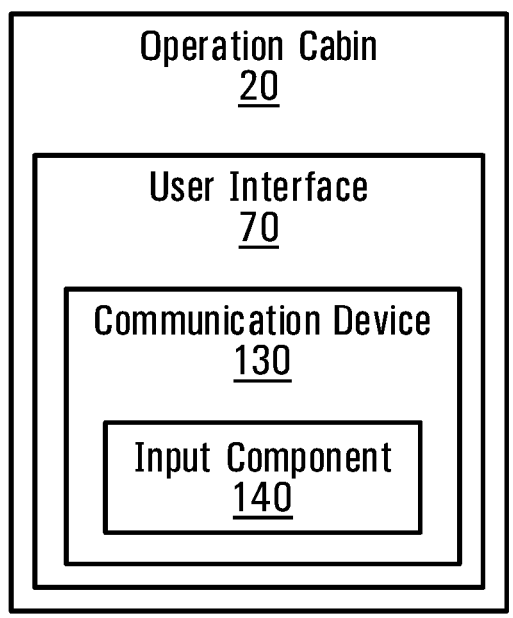
FIG. 19 shows an example of an embodiment of the communication device as part of a user interface of an operator cabin of the vehicle.

For example, in some embodiments, with additional reference to FIG. 19, the communication device 130 may be part of the user interface 70 of the operator cabin 20 of the vehicle 10 (e.g., the input component 140 of the communication device 130 may be part of the instrument panel of the vehicle 10).

Figure 20:
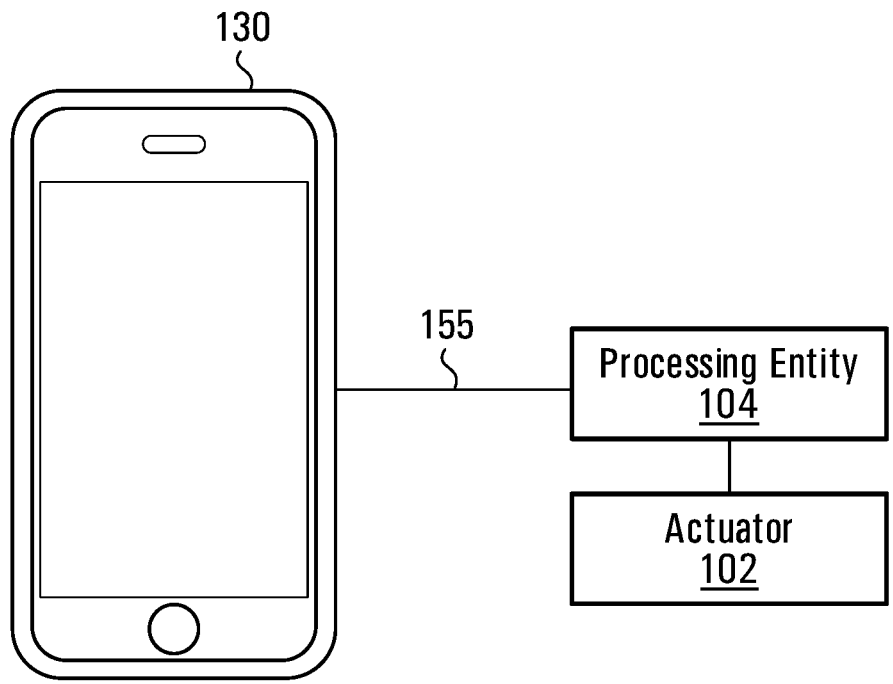
FIG. 20 shows an example of an embodiment in which the communication device is a personal communication device.

As another example, in some embodiments, with additional reference to FIG. 20, the communication device 130 may be a personal communication device (e.g., a smartphone, a computer, etc.) or other device that is usable by the user and distinct from and not built into the user interface 70 of the operator cabin 20 of the vehicle 10. This may be useful, for instance, in situations where the vehicle 10 was not originally manufactured with the track system $16_i$ and/or is not readily modifiable to allow interaction between the control system 100 and the user interface 70 and/or other original components of the vehicle 10.

The communication device 130 may interact with the processing entity 104 of the control system 100 over a communication link 155, which may be wireless and/or wired (e.g., Bluetooth or other short-range or near-field wireless connection, WiFi or other wireless LAN, WiMAX or other wireless WAN, cellular, Universal Serial Bus (USB), etc.). For example, in some embodiments, the communication device 130 may be:

- a smartphone or other wireless phone; a tablet computer; a head-mounted display, smartwatch or other wearable device; or any other communication device carried, worn or otherwise associated with the user;
- a server or other computing entity (e.g., implementing a website) associated with: the user; an organization associated with the user (; a manufacturer of the track system $16_i$ and/or of the vehicle 10; a retailer, distributor, or other vendor of the track system $16_i$ and/or the vehicle 10; or any other party who may have an interest in the track system $16_i$ and/or the vehicle 10;
- etc.

In some cases, such as where the communication device 130 is a smartphone, tablet, head-mounted display, smartwatch, or other communication device carried or worn by the user, communication between the communication device 130 and the processing entity 104 of the control system 100 may be direct, i.e., without any intermediate device. For instance, in some embodiments, this can be achieved by pairing (e.g., Bluetooth pairing) the communication device 130 and the processing entity 104 of the control system 100. In other cases, such as where the communication device 130 is remote from the processing entity 104 of the control system 100, communication between the communication device 130 and the processing entity 104 of the control system 100 may be indirect, e.g., through one or more networks and/or one or more additional communication devices. For example, in some embodiments, the processing entity 104 of the control system 100 may communicate (e.g., via the transmitter 164 and/or the receiver 162 of the processing entity 104) with a WiFi hotspot or cellular base station, which may provide access to a service provider and ultimately the Internet or another network, thereby allowing the processing entity 104 of the control system 100 and the communication device 130 to communicate.

For example, in some embodiments, the communication device 130 may be a smartphone or other mobile phone, a tablet, a smart watch, head-mounted display or other wearable device, or any other communication device that may be carried by the user, and the communication link 155 may be a short-range wireless link (e.g., Bluetooth) or a wired link (e.g., USB); in other embodiments, the communication device 130 may be a server or other computing entity or a smartphone or other mobile phone, a tablet, a smart watch, head-mounted display or other wearable device, or any other communication device that may be carried by the user and the communication link 155 may be implemented by a data network such as the Internet over a wired connection and/or a wireless connection (e.g., WiFi, WiMAX, cellular, etc.); and, in other embodiments, the communication device 130 may be a server or other computing entity and the communication link 155 may be implemented over a wireless connection using, for instance, dedicated short-range communication (DSRC), IEEE 802.11, Bluetooth and CALM (Communications Access for Land Mobiles), RFID, etc.

In some embodiments, an application ("app", i.e., software) may be installed on the communication device 130 to interact with the processing entity 104 of the control system 100 of the vehicle 10. For example, in some embodiments, such as where the communication device 130 is a smartphone, a tablet, a computer, etc., the user may download the app from a repository (e.g., Apple's App Store, iTunes, Google Play, Android Market, etc.) or any other website onto the communication device 130. Upon activation of the app on the communication device 130, the user may access certain features relating to the control system 100 of the vehicle 10 locally on the communication device 130. In addition, a data connection can be established over the Internet with a server of which executes a complementary server-side application interacting with the app on the communication device 130.

For example, in some embodiments, the communication device 130 may be a smartphone of the user of the vehicle 10, onto which an app to interact with the control system 100 of the vehicle 10 has been installed (e.g., downloaded).

Figure 21:
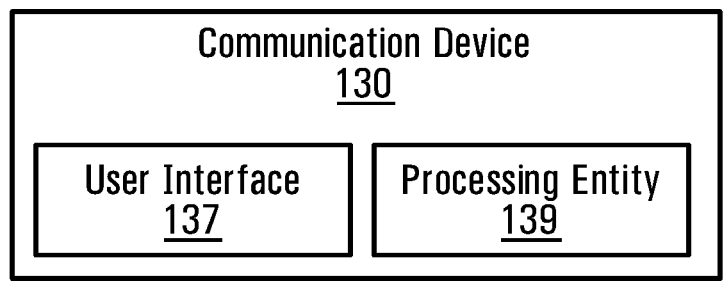
FIGS. 21 and 22 show an example of an embodiment of the communication device.
Figure 22:
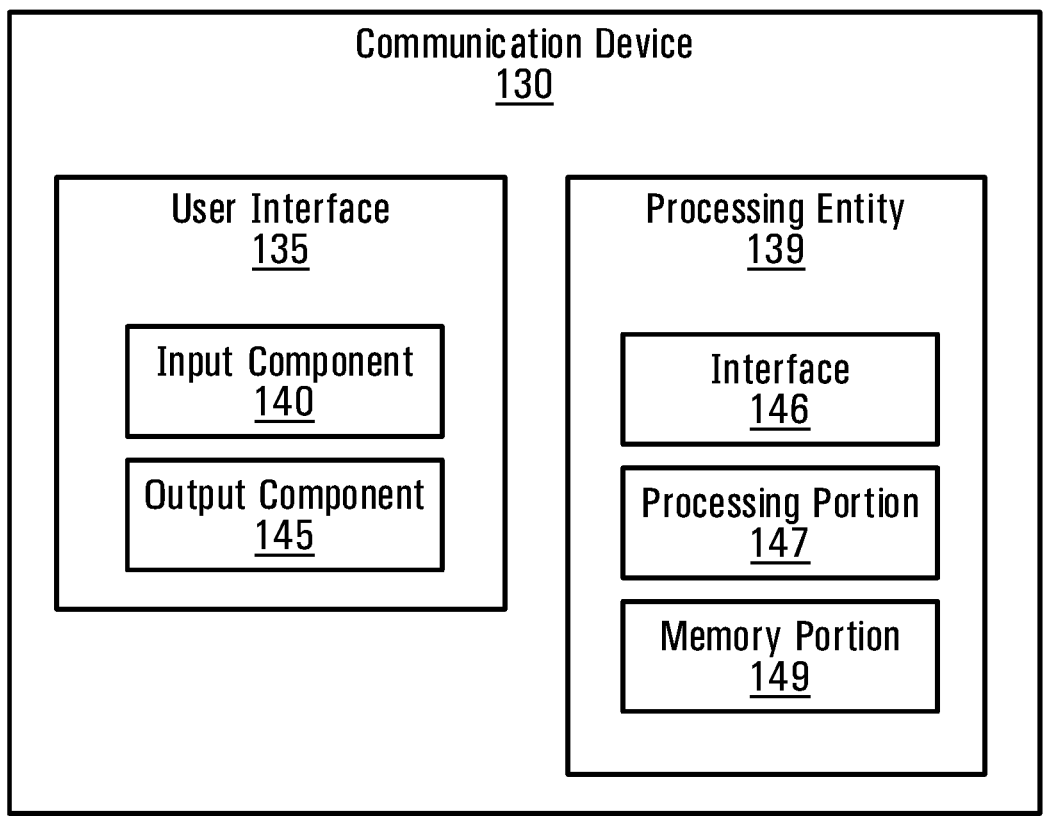

In various embodiments, as shown in FIGS. 21 and 22, the communication device 130 (e.g., whether part of the user interface 70 of the operator cabin 20, or a personal communication device such as a smartphone, tablet, computer, etc.) may comprise a user interface 137 and a processing entity 139. The user interface 137 comprises the input component 140 and, if applicable, the output component 145 (e.g., buttons, knobs, etc., a display, a speaker, etc., of the operator cabin 20, of a smartphone, etc.). The processing entity 139 comprises an interface 146, a processing portion 147, and a memory portion 149, which are implemented by suitable hardware and/or software.

The interface 146 comprises one or more inputs and outputs allowing the processing entity 139 to receive input signals from and send output signals to other components to which the processing entity 139 is connected (i.e., directly or indirectly connected). For example, in this embodiment, an output of the interface 146 is implemented by a transmitter (e.g., a wireless transmitter) to transmit a signal to the processing entity 104 of the control system 100 or the user interface 137. An input of the interface 146 is implemented by a receiver to receive a signal from the user interface 137 or the processing entity 104 of the control system 100.

The processing portion 147 comprises one or more processors for performing processing operations that implement functionality of the processing entity 139. A processor of the processing portion 147 may be a general-purpose processor executing program code stored in the memory portion 149. Alternatively, a processor of the processing portion 147 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 149 comprises one or more memories for storing program code executed by the processing portion 147 and/or data used during operation of the processing portion 147. A memory of the memory portion 149 may be a semiconductor medium (including, e.g., a solid-state memory), a magnetic storage medium, an optical storage medium, and/or any other suitable type of memory. A memory of the memory portion 149 may be read-only memory (ROM) and/or random-access memory (RAM), for example.

In some embodiments, two or more elements of the processing entity 139 may be implemented by devices that are physically distinct from one another and may be connected to one another via a bus (e.g., one or more electrical conductors or any other suitable bus) or via a communication link which may be wired. In other embodiments, two or more elements of the processing entity 139 may be implemented by a single integrated device.

In some embodiments, the control system 100 may control the pivoting movements of respective ones of the track systems $16_1$-$16_4$ about their pivot axis 51 relative to the frame 11 of the vehicle 10 (e.g., control their angle of attack α) differently. For instance, in some embodiments, the processing entity 104 may control the pivoting movement of a front one of the track systems $16_1$-$16_4$ about its pivot axis 51 relative to the frame 11 of the vehicle 10 differently than the pivoting movement of a rear one of the track systems $16_1$-$16_4$ about its pivot axis 51 relative to the frame 11 of the vehicle 10 (e.g., control the angle of attack α of the front one of the track systems $16_1$-$16_4$ differently than the angle of attack α of the rear one of the track systems $16_1$-$16_4$). This may be useful, for instance, to run over obstacle more easily or to enhance traction on soft and/or uneven (e.g. muddy) terrain. As an example, the pivoting movement of a front one of the track systems $16_1$-$16_4$ about its pivot axis 51 relative to the frame 11 of the vehicle 10 differently than the pivoting movement of a rear one of the track systems $16_1$-$16_4$ about its pivot axis 51 to facilitate overcoming a series of obstacles (e.g. moguls, scattered obstacles such as holes and bumps).

The vehicle 10, including the track systems $16_1$-$16_4$ and the control system 100, may be implemented in various other ways in other embodiments.

Figure 23:
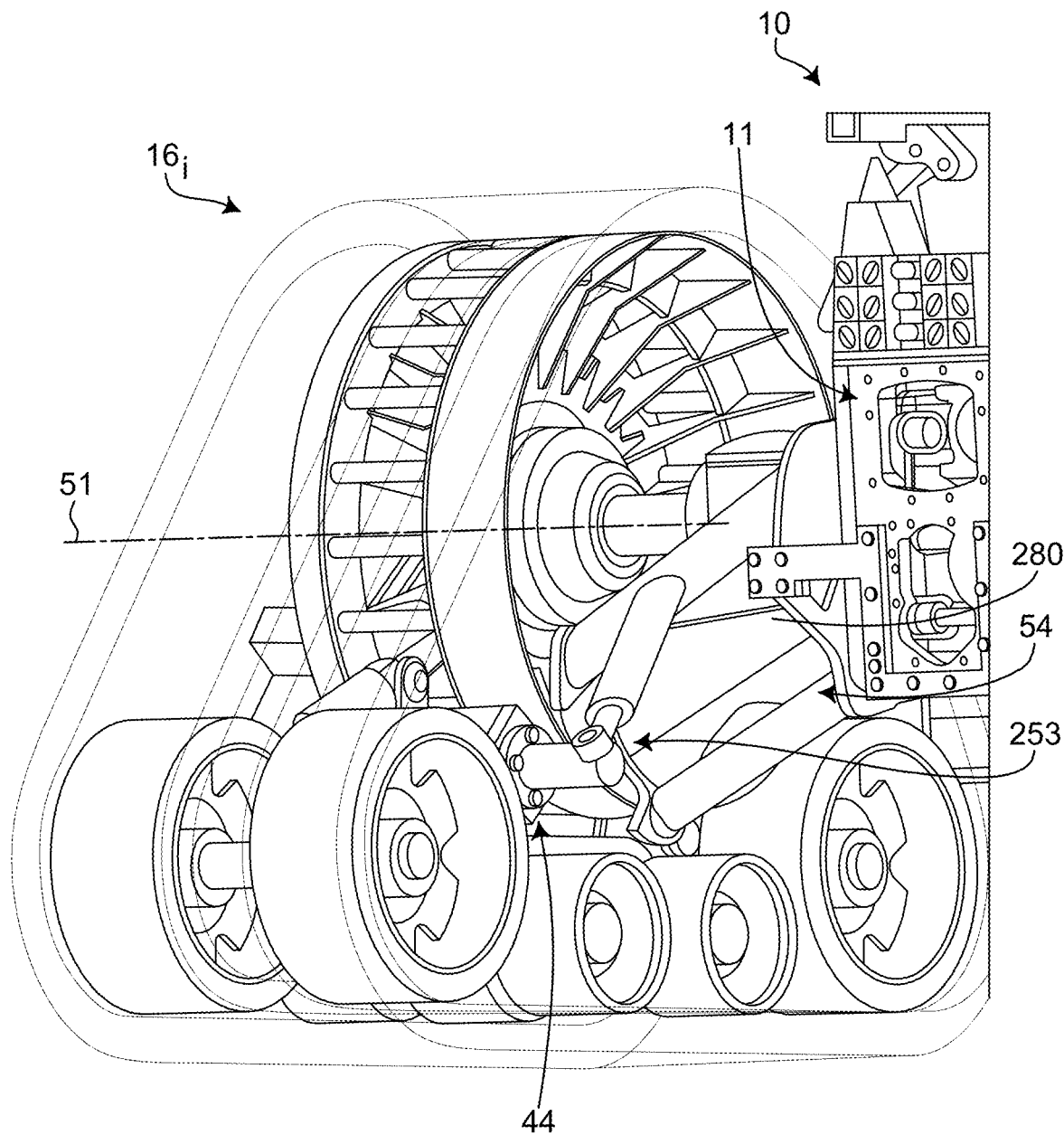
FIG. 23 shows a rear perspective view of an example of another embodiment of an anti-rotation device of a given one of the track systems.
Figure 24:
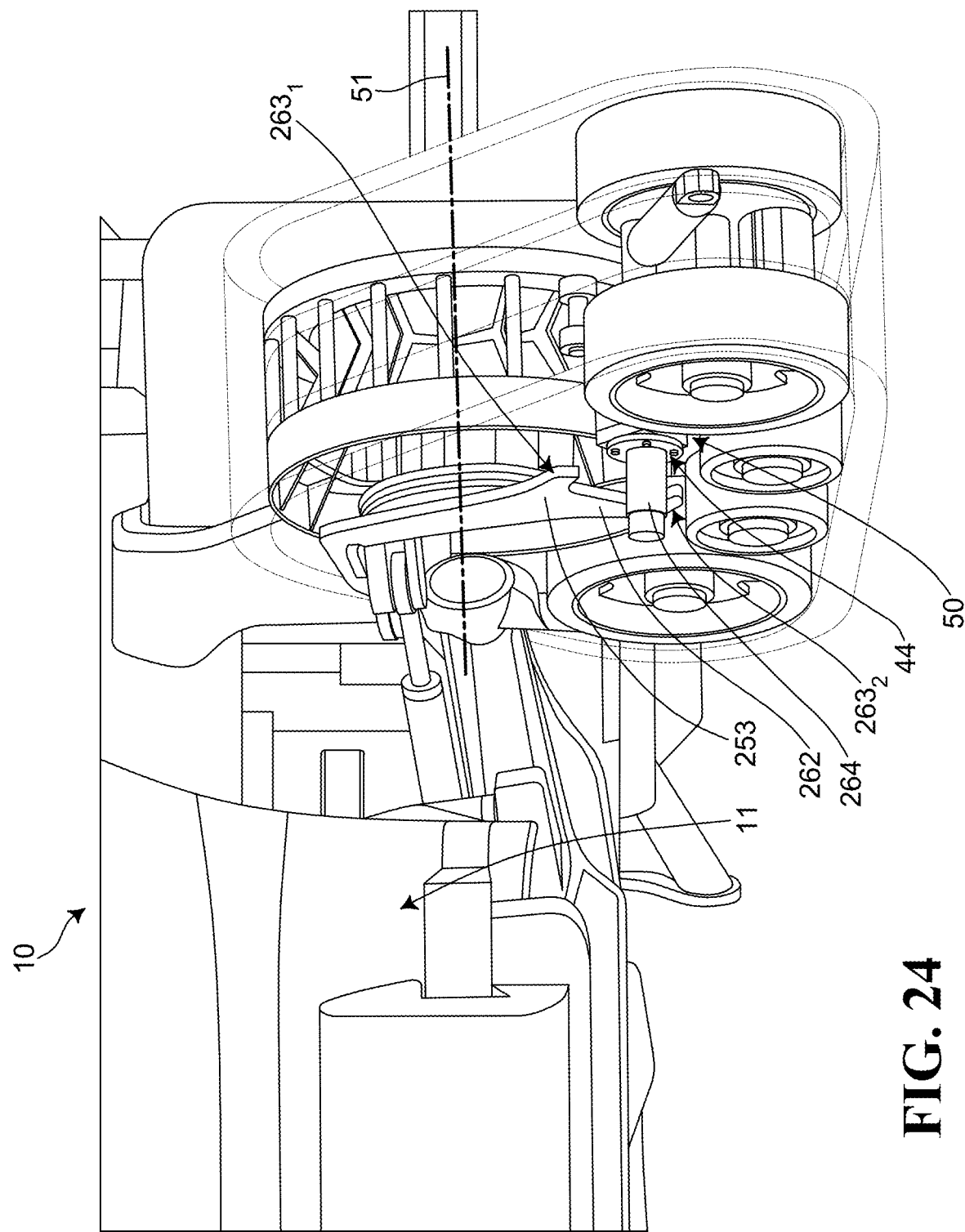
FIGS. 24 and 25 show front perspective views of an example of another embodiment of the anti-rotation device of the given one of the track systems.
Figure 25:
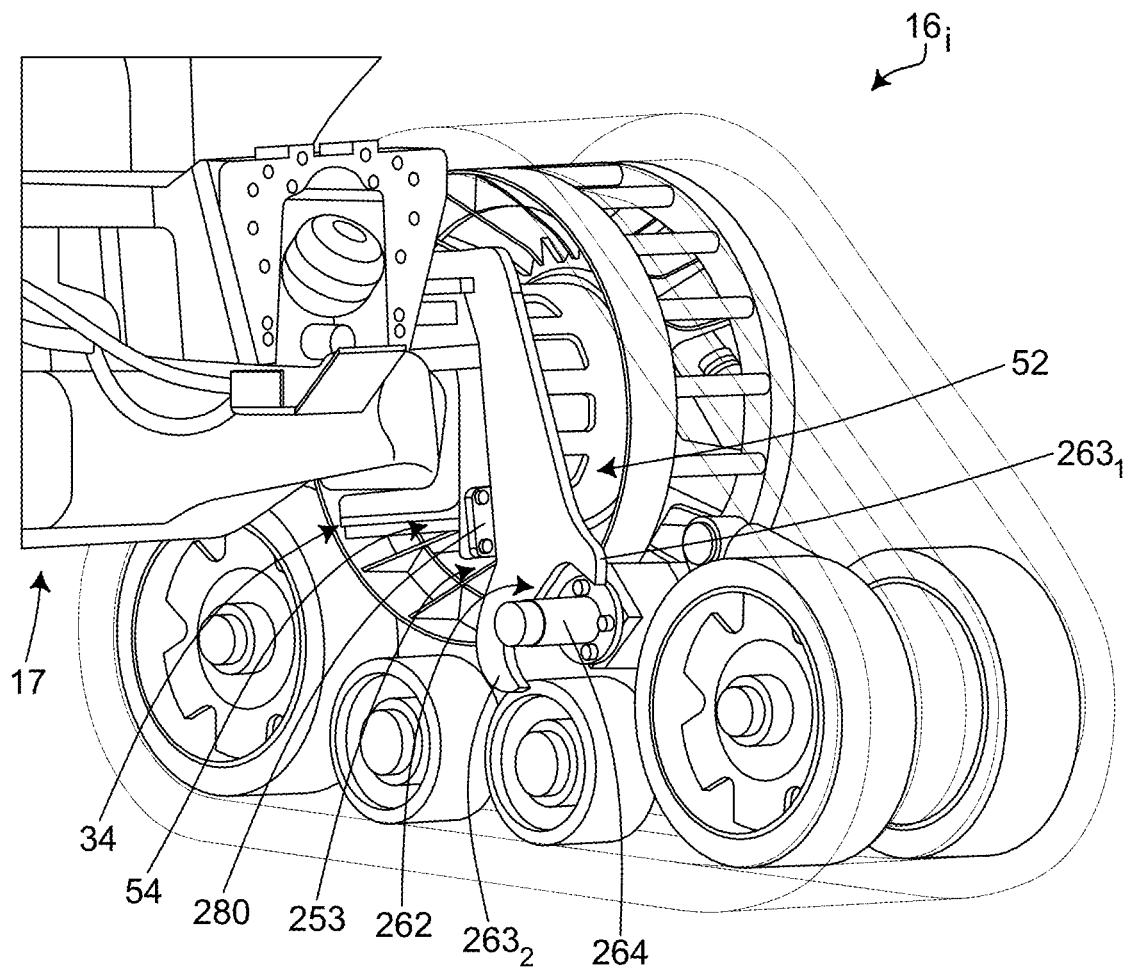

For example, in other embodiments, the anti-rotation device 52 of the track system $16_i$ may be implemented in any other suitable way. For instance, in some embodiments, as shown in FIG. 23, the anti-rotation device 52 comprises an abutting member 253 nonrotatable about the pivot axis 51 relative to the frame 11 of the vehicle 10 and configured to abut the frame 44 of the track system $16_i$ to limit the pivoting movement of the frame 44 of the track system $16_i$ about the pivot axis 51. The abutting member 253 is secured to the nonrotatable structure 54 which, in this embodiment, is a portion of the frame 11 of the vehicle 10. More specifically, in this embodiment, the nonrotatable structure 54 is a bracket 280 connected to a beam of the frame 11 of the vehicle 10. In this example, the abutting member 253 includes an abutment 262 comprising a pair of fingers $263_1$, $263_2$ to engage a projection 264 (e.g., a pin) of the lower portion 50 the frame 44 of the track system $16_i$ that is disposed between the fingers $263_1$, $263_2$ in order to limit the pivoting movement of the track system $16_i$ about the pivot axis 51. As another example, in some embodiments, as shown in FIGS. 24 and 25, the nonrotatable structure 54 to which is secured the abutting member 253 of the anti-rotation device 52 may be part of the steering unit 34 of the steering mechanism 18, such as for each of the front ones of the track systems $16_1$-$16_4$ that are steerable. In this case, the nonrotatable structure 54 is a bracket 280 connected to the steering knuckle of the steering unit 34.

Figure 26:
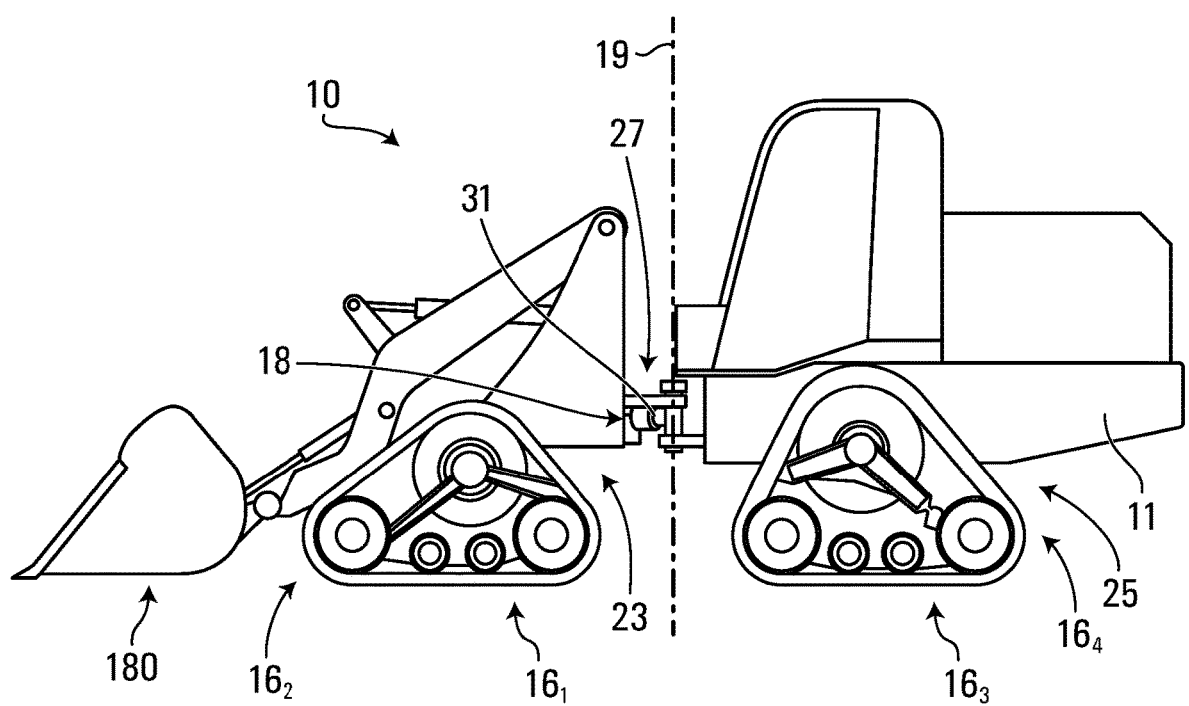
FIG. 26 shows an example of another embodiment in which front ones of the track systems are pivotable relative to a rear portion of a frame of the vehicle.

In other embodiments, each of the front ones of the track systems $16_1$-$16_4$ may be pivotable relative to the frame 11 about the steering axis 19 in any other way in order to steer the vehicle 10. For instance, in some embodiments, as shown in FIG. 26, the front ones of the track systems $16_1$-$16_4$ may be connected to a front portion 23 of the frame 11 that is pivotally coupled to a rear portion 25 of the frame 11 about the steering axis 19 which is defined by a pivot 27 between the front portion 23 and the rear portion 25 of the frame 11. An actuator 31 (e.g., a hydraulic cylinder) of the steering mechanism 18 is controllable to cause pivoting of the front portion 23 of the frame 11 relative to the rear portion 25 of the frame 11 about the steering axis 19. The frame 11 can thus be viewed as being "articulated", and each of the front ones of the track systems $16_1$-$16_4$ is pivotable relative to the frame 11 about the steering axis 19 in that it is pivotable relative to at least part of the frame 11.

In yet other embodiments, none of the track systems $16_1$-$16_4$ may be pivotable relative to the frame 11 of the vehicle 10 to steer the vehicle 10 on the ground. For example, in some embodiments, the vehicle 10 may be steered by operating the track systems $16_1$-$16_4$ differently, such as by moving their tracks 41 at different speeds and/or in different directions.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for purposes of description, but should not be limiting. Various modifications and enhancements will become apparent to those of ordinary skill in the art.

The invention claimed is:

1. A control system for a vehicle, the vehicle comprising a frame extending in a longitudinal direction of the vehicle and a track system for traction of the vehicle, the track system comprising:
   a track comprising a ground-engaging outer side and an inner side opposite to the ground-engaging outer side; and
   a track-engaging assembly for driving and guiding the track around the track-engaging assembly, the track-engaging assembly comprising:
      a frame; and
      a drive wheel for imparting motion to the track;
   the track system being pivotable relative to the frame of the vehicle about a steering axis by a steering mechanism of the vehicle to vary a steering angle of the track system in order to steer the vehicle, the track system being pivotable about a pivot axis relative to the frame of the vehicle such that longitudinal ends of the track system move vertically, wherein an angle of attack is defined between a bottom run of the ground-engaging outer side of the track and the frame, the control system comprising:
      an actuator connectable to the track system; and
      a processing entity comprising one or more processors and one or more memories, the one or more memories storing relationships between one or more system values of:
         a speed of the vehicle,
         a direction of motion of the vehicle,
         the steering angle,
         loading on the track system, and
         a characteristic of the ground, with:
         a value of the angle of attack, the processing entity configured to control the actuator as a function of the one or more system values while the vehicle travels forward for controlling a pivoting movement of the track system about the pivot axis relative to the frame of the vehicle to adjust the angle of attack while the vehicle travels forward.

2. The control system of claim 1, wherein the processing entity is configured to control the actuator based on the steering angle of the track system.

3. The control system of claim 1, wherein the processing entity is configured to control the actuator to vary the angle of attack based on the steering angle of the track system.

4. The control system of claim 1, wherein the processing entity is configured to control the actuator to allow the angle of attack to change based on the steering angle of the track system.

5. The control system of claim 1, wherein the processing entity is configured to control the actuator to prevent the angle of attack from changing based on the steering angle of the track system.

6. The control system of claim 1, wherein the processing entity is configured to control the actuator based on a parameter of a suspension of the vehicle, the parameter of the suspension of the vehicle comprising at least one of a suspension travel position and a suspension stroke position.

7. The control system of claim 6, wherein the processing entity is configured to control the actuator to vary the angle of attack based on the parameter of the suspension of the vehicle.

8. The control system of claim 6, wherein the processing entity is configured to control the actuator to allow the angle of attack to change based on the parameter of the suspension of the vehicle.

9. The control system of claim 6, wherein the processing entity is configured to control the actuator to prevent the angle of attack from changing based on the parameter of the suspension of the vehicle.

10. The control system of claim 1, wherein the processing entity is configured to control the actuator for controlling the pivoting movement of the track system about the pivot axis relative to the frame of the vehicle based on loading on the track system.

11. The control system of claim 1, wherein the processing entity is configured to control the actuator for controlling the pivoting movement of the track system about the pivot axis relative to the frame of the vehicle in order to manage a pressure distribution of the track system on the ground.

12. The control system of claim 11, wherein the processing entity is configured to control the actuator to transfer at least part of loading on the track system towards a longitudinal end portion of the track system.

13. The control system of claim 11, wherein the processing entity is configured to control the actuator to transfer at least part of loading on the track system towards a rear portion of the track system.

14. The control system of claim 13, wherein the processing entity is configured to control the actuator such that a ratio of pressure applied onto the ground at a front portion of the track system over pressure applied onto the ground at the rear portion of the track system is between 0.5 and 1.5.

15. The control system of claim 13, wherein the processing entity is configured to control the actuator such that a ratio of pressure applied onto the ground at a front portion of the track system over pressure applied onto the ground at the rear portion of the track system is between 0.75 and 1.2.

16. The control system of claim 13, wherein the processing entity is configured to control the actuator such that a ratio of pressure applied onto the ground at a front portion of the track system over pressure applied onto the ground at the rear portion of the track system is between 0.95 and 1.05.

17. The control system of claim 1, wherein the track system comprises an anti-rotation device to restrict the pivoting movement of the track system about the pivot axis relative to the frame of the vehicle.

18. The control system of claim 17, wherein the anti-rotation is connected between the frame of the track system and the frame of the vehicle and configured to engage the frame of the track system in order to limit the pivoting movement of the track system about the pivot axis relative to the frame of the vehicle.

19. The control system of claim 1, wherein the processing entity is configured to automatically generate a command conveyed to the actuator to control the pivoting movement of the track system about the pivot axis relative to the frame of the vehicle.

20. The control system of claim 1, wherein the processing entity is configured to receive a command provided by a user and conveyed to the actuator to control the pivoting movement of the track system about the pivot axis relative to the frame of the vehicle.

21. The control system of claim 20, wherein the processing entity is configured to communicate with a communication device usable by the user to provide the command.

22. The control system of claim 21, wherein the vehicle comprises a user interface and the communication device is part of the user interface of the vehicle.

23. The control system of claim 21, wherein the communication device is a personal communication device.

24. The control system of claim 21, wherein the personal communication device is one of a wireless phone and a tablet computer.

25. The control system of claim 21, wherein the processing entity is configured to wirelessly communicate with the communication device.

26. The control system of claim 1, wherein the actuator is a fluidic actuator.

27. The control system of claim 26, wherein the fluidic actuator is a hydraulic actuator.

28. The control system of claim 1, wherein the processing entity is configured to control the actuator by varying a length of the actuator.

29. The control system of claim 1, wherein the processing entity is configured to control the actuator by allowing a length of the actuator to change.

30. The control system of claim 1, wherein the processing entity is configured to control the actuator by preventing a length of the actuator from changing.

31. The control system of claim 1, wherein the processing entity is configured to control the actuator based on at least one of: information regarding a state of the vehicle; information regarding an environment of the track system; and information regarding a state of the track system.

32. The control system of claim 1, wherein the processing entity is configured to control the actuator based on the orientation of the track system.

33. The control system of claim 32, wherein the orientation of the track system includes the angle of attack.

34. The control system of claim 1, wherein the processing entity is configured to control the actuator based on the characteristic of the ground.

35. The control system of claim 34, wherein the characteristic of the ground is a profile of the ground.

36. The control system of claim 34, wherein the characteristic of the ground is a compliance of the ground.

37. The control system of claim 1, wherein the processing entity is configured to control the actuator based on a speed of motion of the track around the track-engaging assembly.

38. The control system of claim 1, comprising a sensor for sensing a parameter of the vehicle, wherein the processing entity is configured to control the actuator based on a signal from the sensor.

39. The control system of claim 38, wherein the sensor is configured to wirelessly transmit the signal.

40. The control system of claim 1, comprising a plurality of sensors for sensing parameters of the vehicle, wherein the processing entity is configured to control the actuator based on signals from the sensors.

41. The control system of claim 1, wherein the track system is a first track system, the actuator being a first actuator, the vehicle comprising a second track system comprising:
a track comprising a ground-engaging outer side and an inner side opposite to the ground-engaging outer side; and
a track-engaging assembly for driving and guiding the track of the second track system around the track-engaging assembly of the second track system, the track-engaging assembly of the second track system comprising:
a frame; and
a drive wheel for imparting motion to the track of the second track system;
the second track system being pivotable about a second pivot axis relative to the frame of the vehicle such that longitudinal ends of the second track system move vertically, the processing entity being configured to control a second actuator connectable to the second track system for controlling a pivoting movement of the second track system about the second pivot axis relative to the frame of the vehicle.

42. The control system of claim 41, wherein the processing entity is configured to control the first actuator and the second actuator differently for controlling the pivoting movement of the first track system about the first pivot axis relative to the frame of the vehicle and the pivoting movement of the second track system about the second pivot axis relative to the frame of the vehicle differently.

43. A control system for a vehicle, the vehicle comprising a frame extending in a longitudinal direction of the vehicle and a track system for traction of the vehicle, the track system comprising:
a track comprising a ground-engaging outer side and an inner side opposite to the ground-engaging outer side; and
a track-engaging assembly for driving and guiding the track around the track-engaging assembly, the track-engaging assembly comprising:
a frame; and
a drive wheel for imparting motion to the track;
the track system being pivotable relative to the frame of the vehicle about a steering axis by a steering mechanism of the vehicle to vary a steering angle of the track system in order to steer the vehicle, the track system being pivotable about a pivot axis relative to the frame of the vehicle to vary an angle of attack of the track system, the control system comprising:
an actuator connectable to the track system; and
a processing entity comprising one or more processors and one or more memories, the processing entity configured to control the actuator while the vehicle travels forward based on a speed of the vehicle and on a direction of motion of the vehicle for controlling the angle of attack of the track system while the vehicle travels forward, the processing entity further configured to increase, decrease, lock, and unlock the angle of attack of the track system based on the speed and the direction of motion of the vehicle.

44. A control system for a vehicle, the vehicle comprising a frame extending in a longitudinal direction of the vehicle and a track system for traction of the vehicle, the track system comprising:
a track comprising a ground-engaging outer side and an inner side opposite to the ground-engaging outer side; and
a track-engaging assembly for driving and guiding the track around the track-engaging assembly, the track-engaging assembly comprising:
a frame; and
a drive wheel for imparting motion to the track;
the track system being pivotable relative to the frame of the vehicle about a steering axis by a steering mechanism of the vehicle to vary a steering angle of the track system in order to steer the vehicle, the track system being pivotable about a pivot axis relative to the frame of the vehicle such that longitudinal ends of the track system move vertically, the control system comprising:
an actuator connectable to the track system; and
a processing entity comprising one or more processors and one or more memories, the processing entity configured to control the actuator based on a speed of the vehicle and on a direction of motion of the vehicle for controlling a pivoting movement of the track system about the pivot axis relative to the frame of the vehicle in order to manage a pressure distribution of the track system on the ground while the vehicle travels forward, the processing entity further being configured to change the angle of attack to overcome obstacles.

45. A control system for a vehicle, the vehicle comprising a frame extending in a longitudinal direction of the vehicle and a track system for traction of the vehicle, the track system comprising:
a track comprising a ground-engaging outer side and an inner side opposite to the ground-engaging outer side; and
a track-engaging assembly for driving and guiding the track around the track-engaging assembly, the track-engaging assembly comprising:
a frame; and
a drive wheel for imparting motion to the track;
the track system being pivotable relative to the frame of the vehicle about a steering axis by a steering mechanism of the vehicle to vary a steering angle of the track system in order to steer the vehicle, the track system being pivotable about a pivot axis relative to the frame of the vehicle such that longitudinal ends of the track system move vertically, the control system comprising:
an actuator connectable to the track system; and
a processing entity comprising one or more processors and one or more memories, the one or more memories storing relationships between one or more system values of:
a speed of the vehicle,
a direction of motion of the vehicle,
the steering angle,
loading on the track system, and
a characteristic of the ground, with:
a value of the angle of attack, the processing entity configured to control the actuator as a function of the one or more system values for controlling a pivoting movement of the track system about the pivot axis relative to the frame of the vehicle, including to adjust an orientation of the track system relative to the frame of the vehicle while the vehicle travels forward.

* * * * *